(12) United States Patent
Boybat Kara et al.

(10) Patent No.: US 11,188,825 B2
(45) Date of Patent: Nov. 30, 2021

(54) MIXED-PRECISION DEEP-LEARNING WITH MULTI-MEMRISTIVE DEVICES

(71) Applicant: International Business Machines Corporation, Armonk, NY (US)

(72) Inventors: Irem Boybat Kara, Zurich (CH); Manuel Le Gallo-Bourdeau, Zurich (CH); Nandakumar Sasidharan Rajalekshmi, Thalwil (CH); Abu Sebastian, Adliswil (CH); Evangelos Stavros Eleftheriou, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 16/243,477

(22) Filed: Jan. 9, 2019

(65) Prior Publication Data
US 2020/0118001 A1    Apr. 16, 2020

Related U.S. Application Data

(60) Provisional application No. 62/745,545, filed on Oct. 15, 2018.

(51) Int. Cl.
*G06N 3/08* (2006.01)
*G06F 12/04* (2006.01)
*G06N 3/063* (2006.01)

(52) U.S. Cl.
CPC ............ *G06N 3/084* (2013.01); *G06F 12/04* (2013.01); *G06N 3/0635* (2013.01)

(58) Field of Classification Search
CPC ...... G06N 3/063; G06N 3/0635; G06N 3/084; G06F 12/04
See application file for complete search history.

(56) References Cited

U.S. PATENT DOCUMENTS

| 2009/0292661 A1 | 11/2009 | Haas |
| 2015/0170028 A1 | 6/2015 | Gupta et al. |
| 2018/0113708 A1 | 4/2018 | Corbal et al. |

OTHER PUBLICATIONS

Merced-Grafals, Emmanuelle J., et al. "Repeatable, accurate, and high speed multi-level programming of memristor 1T1R arrays for power efficient analog computing applications." Nanotechnology 27.36 (2016): 365202. (Year: 2016).*

(Continued)

*Primary Examiner* — Hal Schnee
(74) *Attorney, Agent, or Firm* — Scully, Scott, Murphy & Presser, P.C.; Daniel P. Morris

(57) ABSTRACT

A computer-implemented method of mixed-precision deep learning with multi-memristive synapses may be provided. The method comprises representing, each synapse of an artificial neural network by a combination of a plurality of memristive devices, wherein each of the plurality of memristive devices of each of the synapses contributes to an overall synaptic weight with a related device significance, accumulating a weight gradient $\Delta W$ for each synapse in a high-precision variable, and performing a weight update to one of the synapses using an arbitration scheme for selecting a respective memristive device, according to which a threshold value related to the high-precision variable for performing the weight update is set according to the device significance of the respective memristive device selected by the arbitration schema.

25 Claims, 19 Drawing Sheets

(56) References Cited

OTHER PUBLICATIONS

Boybat, I., et al. "Neuromorphic computing with multi-memristive synapses", Nature Communications 2018, Jun. 2018, pp. 1-12, vol. 9, Article No. 2514.

Burr, G.W., et al. "Large-scale neural networks implemented with non-volatile memory as the synaptic weight element: Comparative performance analysis (accuracy, speed, and power)", 2015 IEEE International Electron Devices Meeting (IEDM), Dec. 2015, pp. 4.4.1-4.4.4.

Fumarola, A., et al. "Accelerating Machine Learning with Non-Volatile Memory: exploring device and circuit tradeoffs", 2016 IEEE International Conference on Rebooting Computing (ICRC), Oct. 2016, 8 pages.

Krawczuk, I., "Modelling and Design of Hybrid CMOS-Memristive Neuromorphic Systems for STDP Implementations", DissTU Munich, Nov. 7, 2016, 54 pages.

Li, Y., et al. "Robust synchronization of memristive neural networks with strong mismatch characteristics via pinning control", Neurocomputing, Received Apr. 13, 2017, Revised Nov. 26, 2017, Accepted Feb. 2, 2018, Available online Feb. 8, 2018, pp. 144-154.

Sebastian, A., "Computational memory: A stepping stone to non-von Neumann computing?", Stanford EE380, Mar. 7, 2018, 55 pages.

Burr, G.W., et al., "Experimental Demonstration and Tolerancing of a Large-Scale Neural Network (165 000 Synapses) Ssing Phase-Change Memory as the Synaptic Weight Element", IEEE Transactions on Electron Devices, Nov. 2015, pp. 3498-3507, vol. 62, No. 11.

Boybat, I., et al., "Stochastic weight updates in phase-change memory-based synapses and their influence on artificial neural networks", 2017 13th Conference on Ph.D. Research in Microelectronics and Electronics (PRIME 2017), Jun. 12-15, 2017, pp. 13-16, Paper P134.

Nandakumar, S.R. et al., "Mixed-precision architecture based on computational memory for training deep neural networks", 2018 IEEE International Symposium on Circuits and Systems (ISCAS), May 27-30, 2018, 5 pages.

Nandakumar, S.R. et al., "Mixed-precision training of deep neural networks using computational memory", arXiv:1712.01192v1, Dec. 4, 2017, pp. 1-9.

Boybat, I., et al., "An efficient synaptic architecture for artificial neural networks", 2017 Non-Volatile Memory Technology Symposium (NVMTS), Aug. 30-Sep. 1, 2017, 4 pages.

\* cited by examiner $$W_i = \alpha_N W_{i,N} + \alpha_{N-1} W_{i,N-1} + \ldots + \alpha_1 W_{i,1}$$

Repeat down to device 1, then start back from device N $W_i = W_{i,N} + W_{i,N-1} + \ldots + W_{i,1}$ $$W_i = \alpha_N W_{i,N} + \alpha_{N-1} W_{i,N-1} + \ldots + \alpha_1 W_{i,1}$$

MIXED-PRECISION DEEP-LEARNING WITH MULTI-MEMRISTIVE DEVICES

FIELD OF THE INVENTION

The present disclosure relates generally to a method for a neural network with memristive devices, and more specifically, to a computer-implemented method for mixed-precision deep learning with multi-memristive synapses. The present disclosure relates further to a related system for mixed-precision deep learning with multi-memristive synapses, and a computer program product.

BACKGROUND

Today's computing systems continue to rely on the von-Neumann architecture. However, this architecture used for decades is reaching its limits. Now, it is widely believed that technology is entering the third era of cognitive computing. Most of today's approaches to cognitive computing are still using traditional architectures by simulating the functioning of biological systems, like the human brain. Longer-term, it is believed that the current architectures with their highly area/power inefficiency are not best suited for brain-inspired computing. In natural, biological systems, neurons process input signals and generate output signals which are transmitted to other neurons via respective synapses. The synapses are gatekeepers between the different neurons by way of technically speaking its conductance of transmitted signals, also known as "synaptic efficacy" or synaptic weight. This way, the synaptic weight can change the neuronal activity, and this "plasticity" of the synapses is crucial to memory and other brain functions. Large scale artificial neural networks (ANN), comprising, e.g., tens of thousands of artificial neurons, connected by tens of thousands of artificial synapses in a networked fashion, may be arranged in several layers of artificial neurons.

ANNs have been successfully applied in various complex tasks such as speech and image recognition and recently also in debating a topic with a human counterpart. ANNs typically require a training using a training data set in a supervised learning process during which individual synaptic weights are determined. This way, the neuronal network "learns" from the training data in a recursive process. The output signals from an output neuron layer are compared with the expected network output in order to determine errors and updating the synaptic weights to reduce a remaining error until a convergence condition is met. In particular, the steps of the iterative training involve typically a forward propagation operation, a back-propagation operation and a weight-update operation. In the forward propagation operation, signals derived from the training data are propagated from the input neuron layer to the output neuron layer. The resulting errors are then propagated back (back-propagation) through the network, thereby determining error signals for neurons in each layer except the input layer. In the weight-update operation, the synaptic weights are then updated based on these error signals and the neuron output signals during the forward propagation. After the training phase, the neuronal network generates output signals based on input signals to the neuronal network, reflecting the "learned status" developed during the training phase.

One of the approaches to realize the areal/power benefits of this kind of new architectures, may be to realize that the synapses and possibly also the neuronal cache elements may use nanoscale memristive devices. Memristive devices are resistive devices whose resistance depends on the history of the current that had previously flown through it. They can be arranged in higher-density crossbar arrays and each memristor can be used to store multiple bits of information. These properties make memristors suitable to be used as synapses in neuronal networks, in which a vast amount of synapses is present. Current available memristors do not reach the preciseness of "high-resolution" digital processing, (e.g., calculations in 16, 32 or 64 bit); thus, memristors with its inherent "low precision" characteristics as storage and/or computing devices require compromises and/or special techniques to combine the memristors with high precision digital computing devices.

The "low precision" of memristive devices remains a challenge if combining them with other high precision calculation components used for artificial synapses and artificial neurons. Hence, there is a need to overcome the "precision gap" between memristive devices used as synapses and digital calculations used for other types of computing requirements in cognitive computing systems.

SUMMARY

According to one aspect of the present invention, a computer-implemented method for mixed-precision deep learning with multi-memristive synapses may be provided. The method may comprise representing each synapse of an artificial neural network by a combination of a plurality of memristive devices. Each of the plurality of memristive devices of each of the synapses may contribute to an overall synaptic weight with related device significance.

The method may comprise accumulating a weight gradient $\Delta W$ for each synapse in a high-precision variable $\chi$, and performing a weight update to one of the synapses using an arbitration scheme for selecting a respective memristive device, according to which a threshold value related to the high-precision variable $\chi$ for performing the weight update is set according to the device significance of the respective memristive device selected by the arbitration schema.

According to another aspect of the present invention, a related system for mixed-precision deep learning with multi-memristive synapses may be provided. The system may comprise a plurality of synapses, wherein each of the plurality of synapses is a portion of an artificial neural network, wherein each of the plurality of synapses is represented by a combination of a plurality of memristive devices, wherein each of the plurality of memristive devices of each of the synapses contributes to an overall synaptic weight with a related device significance, an accumulation unit adapted for accumulating a weight gradient $\Delta W$ for each synapse in a high-precision variable $\chi$, and a programming circuit adapted for performing a weight update to one of the synapses using an arbitration scheme for selecting a respective memristive device, according to which a threshold value related to the high-precision variable $\chi$ for performing the weight update is set according to the device significance of the respective memristive device selected by the arbitration.

The proposed computer-implemented method for mixed-precision deep learning with multi-memristive synapses may offer multiple advantages and technical effects:

The proposed solution is instrumental in building better functioning mixed-precision in-memory computing systems using multi-memristive synapses in artificial neural networks. The weight update scheme for the synapses for mixed-precision deep learning systems with multi-memristive synapses may be optimized systematically.

For deep learning methods and systems, an increased precision and reliability of weight updates is required to obtain higher performance of the underlying systems. Traditional in-memory computing cannot achieve competitive performance of a comparable areal/power efficiency and in-memory computing with memristive devices can also not achieve competitive performance compared to high-precision software simulations. This is due to currently unavoidable and undesirable device "low precision" characteristics of memristive devices such as conductance response non-linearity, conductance response asymmetry, granularity, and array-level variability.

The here proposed concept with a mixed-precision in-memory, computational framework may address the challenges of inexactness with in-memory computing using memristive devices in a combination with high-precision digital computing devices, and mostly still retain the benefits of significant areal/power/speed improvements of in-memory computing.

Additional architectural solutions such as multi-memristive synapses may help with increasing the precision and reliability of weight updates of artificial synapses by improving nonlinear memristive device characteristics. The usage of a threshold value, in order to determine a requirement for an update of the weight of a memristive device and the non-performing of an update if the update value is below the device granularity, may help to reduce power consumption of the underlying artificial neuron network and increase the overall system performance.

Furthermore, a wide variety of updating the synapse's weights in an array of multi-memristive devices functioning as artificial synapses is possible and supported by the proposed method using a weight update threshold value.

The proposed architecture also offers several advantages in terms of reliability. The other constituent devices of a synapse could compensate for the occasional device failure. In addition, each device in a synapse gets programmed less frequently than if a single device were used, which effectively increases the overall lifetime of a multi-memristive synapse. The potentiation and depression counters reduce the effective number of programming operations of a synapse, further improving endurance-related issues.

In the following, additional embodiments of the inventive concept applicable to the method as well as to the related system will be described.

According to one embodiment of the method, the threshold value for performing the weight update may be set to a minimum device granularity of the memristive devices. The device granularity may be denoted as c in this document. Thus, a weight update is only performed if "it makes sense", i.e., if the weight update is larger than the device granularity, given the differences in preciseness of the memristive devices and a high-accuracy weight update value calculation/accumulation circuit.

According to one useful embodiment of the method, the memristive devices may either be binary memristive devices or analog resistive devices. Thus, the method works with both types of different memristive devices. It is not required to significantly change functions of the method depending on the type of memristive device.

According to one possible embodiment of the method, the device significance of all memristive devices of one synapse may be equal in particular, equal to 1 and the weight update $\Delta W$ may be performed according to the following principle:
as long as $|\chi_i| \geq \varepsilon$, i.e., as long as the weight update $\Delta W$ is larger than the memristive device granularity, repeat the following steps: applying a pulse to a selected—in particular selected by a selection clock—memristive device, decrease $\chi_i$ by $\text{sign}(\chi_i)^*\varepsilon$, and select a next memristive device, again selected by the selection clock. This embodiment may represent a relative basic implementation of the method.

An even simpler embodiment may be described as follows: The process of the above paragraph is performed without the repetition for a next memristive device, i.e., only for one memristive device if the condition $|\chi_i| \geq \varepsilon$ satisfied.

According to another possible embodiment of the method according to claim 1, the device significance of all memristive devices of one synapse may be equal—in particular, equal to 1—and the weight update may be performed according to the following concept: set $\chi_i = \chi_0$ and, as long as, $|\chi_i| \geq N^*\varepsilon$, repeat: applying a pulse to all memristive devices and decrease $\chi_i$ by $\text{sign}(\chi_i)^*N^*\varepsilon$, i.e., $\chi_{i, next} = \chi_{i, current} - \text{sign}(\chi_{i,current})^*N^*\varepsilon$; until $|\chi_i| \geq N^*\varepsilon$ is no longer satisfied. Thereby, N is the number of all devices and $\varepsilon$=device granularity.

The current embodiment may also comprise: as long as $|\chi_i| \geq (N-r)^*\varepsilon$, repeat the following: applying a pulse to all memristive devices and decrease $\chi_i$ by $\text{sign}(\chi_i)^*(N-r)^*\varepsilon$, wherein r=1, and repeat the previous step until $|\chi_i| < \varepsilon$, wherein for each iteration r is increased by, e.g., 1.

Again, the procedure may be repeated until the weight update value is below the device significance value E. This embodiment may also be a relatively easy to implement example.

According to a further possible embodiment of the method, a selection clock may be used for addressing a memristive device of a synapse. The selection clock address—in particular a pointer of the selection clock—may be incremented by a predefined increment rate—e.g., but not limited to 1—after a pulse may be applied to the selected memristive device. Hence, after the application of the pulse to the memristive device, the selection clock may address/may point to the next memristive device.

According to one advantageous embodiment of the method, each of N memristive devices of a synapse represent each a weight factor $W_n$, $n \in 1, 2, \ldots, N$, wherein the overall synaptic weight W may be determined by $$W = \alpha_N^*W_N + \alpha_{N-1}^*W_{N-1} + \alpha_1 + ^*W_1,$$

and wherein $\alpha_N > \alpha_{N-1} > \ldots > \alpha_1$ may be the device significances of the respective memristive devices. Assigning different weight factors to different memristive devices of a synapse may allow a more fine granular control of the synapse function and accordingly better adjustable algorithms for controlling the weight update process of the synapses.

According to one embodiment of the method, during each synaptic weight update, only one memristive device n may be updated by a pulse. Thereby, the memristive device n may be determined by starting with the memristive device N having the highest significance $\alpha_N$ and continuing with memristive devices having decreasing significance values until the memristive device 1 with the significant factor $\alpha_1$ according to the value of $\chi$.

In particular, the pulse is applied to the memristive device only if the condition, $|\chi_i| \geq \alpha_n^*\varepsilon$ is satisfied. Also here the value if $\chi$ is decreased according to $\chi - \text{sign}(\chi)^*\alpha_n^*\varepsilon$. The weight update is then complete. If the condition $|\chi_i| \geq \alpha_n^*\varepsilon$ is not satisfied, the selector clock may point to the next memristive device with the second highest multiplication/significance factor, and so on.

According to another embodiment of the method, only one memristive device may be updated during each synaptic weight update. Thereby, respective memristive devices n of all synapses having the same significance value $\alpha_n$ are selected for update for $X_n$ training examples of the artificial neural network. Consequently, for the next $\chi_{n'}$ training examples respective devices n' are selected for all synapses with significance $\alpha_{n'}$, and so on. It may be noted that any order may be possible.

Also here, if $|\chi_i| \geq \alpha_n * \varepsilon$ is satisfied, a pulse may be applied to the corresponding device and the value of $\chi$ is decreased to $\chi - \text{sign}(\chi) * \alpha_n * \varepsilon$ and the weight update is complete. For the next $X_{N-1}$ training examples, the device N-1 is selected for all the synapses of the neural network. The weight update for the device N-1 is equivalent to the weight update for the device N. The procedure is repeated down to device 1 and the procedure may be started back from device N.

According to a further embodiment of the method, multiple memristive devices during each synaptic weight update may be updated by multiple pulses as long as $|\chi_i| \geq \alpha_n * \varepsilon$. Thereby, $\chi_i$ may be decreased according to $\chi_i - \text{sign}(\chi_i) * \alpha_n * \varepsilon$ after an application of every pulse to the respective memristive device n. Thereby, the procedure may start with the memristive device N having the highest significance $\alpha_N$ and continuing with memristive devices having sequentially decreasing significance values, i.e., $\alpha_{N-1}, \alpha_{N-2}, \ldots, \alpha_1$, until the memristive device 1 with the significant factor $\alpha_1$.

Thus, in this embodiment as many as appropriate number of pulses may be applied to one memristive device before moving to the next memristive device. This alternative may increase the performance of the process because no switching of the selection clock may be required after each pulse.

According to another embodiment of the method, only one memristive device n may be updated out of N memristive devices during each synaptic weight update by multiple pulses as long as $|\chi_i| \geq \alpha_n * \varepsilon$. Thereby, $\chi_i$ may be decreased according to $\chi_i - \text{sign}(\chi_i) * \alpha_n * \varepsilon$ after the application of every pulse, wherein respective memristive devices n of all synapses starting with the devices having the significance value $\alpha_n$ are selected for update for $X_n$ training examples of the artificial neural network.

For the next $X_n$ training examples, memristive device n' may be selected for all synapses of the neural network. The weight update schema may be equivalent to the one just described for this embodiment.

Hence, also the option with a pulse to each memristive device may be possible adding another alternative to the plurality of implementation options.

According to one additional embodiment of the method, the significant factors may be chosen according to $\alpha_N = k^{(N-1)}, \alpha_{N-1} = k^{(N-2)}, \ldots, \alpha_1 = k^0$. Thereby, during a weight update, a number of pulses p for updating a memristive device may be determined by $p = \text{floor}(|\chi|/\varepsilon)$. The number of pulses may be converted to a number base k, and pulses may be applied to corresponding memristive devices in parallel according to a value $p_{base(k)}$. It may be noted that each bit from $p_{base(k)}$ may represent a number of pulses to be applied to the corresponding memristive device. Also here $\chi$ may be decreased after each cycle according to $\chi - \text{sign}(\chi) * p * \varepsilon$.

Thus, the special selection of the significance factors $\alpha_i$ may allow a parallel weight update allowing increasing the performance.

It may also be noted that the application of these pulses may be calculated either at every weight update or every X weight updates. Thus, also this embodiment allows flexibility in the implementation.

It may be noted that the floor function is the function that takes as input a real number x and gives as output the greatest less than or equal to x, denotes floor(x)=[x], e.g., floor(2.4)=2. Similarly, the ceiling function maps x to the least integer greater than or equal to x, denotes ceil(x), e.g., ceil(2.4)=3, and floor(2)=ceil(2)=2.

Before a continuation of the figures, a differentiation may be made between a differential synaptic architecture of memristors devices, and a non-differential synaptic architecture.

The general concept of the here proposed inventive concept may be more directed to non-differential architectures. I.e., if one wants to increase a synaptic weight, the pulses applied are so-called "set pulses" or potentiation pulses (pulses with certain amplitudes into durations). If—on the other side—one wants to decrease the synaptic weight, the pulses applied are "reset pulses" or depression pulses (pulses with larger amplitudes).

Which of the pulses (set or reset) one applies is determined by $\chi$. If $\chi > 0$ one applies set pulses; and if $\chi < 0$, the pulses to be applied are reset pulses. After a weight update, because of the decrement of $\chi$ taking $\text{sign}(\chi)$ into account, the schemas for the proposed concept are compatible with both types of pulses.

However, the here proposed general concept may also be implemented together with a differential synaptic architecture. Some memristive devices exhibit asymmetric conductance changes: with set pulses, the conductance can be increased gradually in one direction. With the reset pulse, there is an abrupt change in the other direction across the gradual steps in the other direction.

One possible solution using differential synaptic architectures is to use two PCM devices (phase change memory), or better two sets of PCM devices, one being positive, the other for the negative updates ("differential architecture"). The overall weight of a synapse is then the difference of weights of corresponding PCM sets: W=(W+)-(W-).

In such architecture, if one wants to increase the synaptic weight, the pulses to be applied are set pulses to the group of W+ memristive devices. In case one wants to decrease the synaptic weight, the pulses to be applied are set pulses to the group of W- memristive devices.

Which of the groups to be chosen is determined by $\chi$. If $\chi > 0$, one chooses the group with W+; and if $\chi < 0$, one chooses the group with W-. After an update, since one decrements $\chi$ taking $\text{sign}(\chi)$ into account, the schemas of the proposed concept are compatible also with this architecture.

Occasionally, the memristive devices may need to be read and updated because some of them might have reached their maximum allowed weight (maximum conductance or resistance). This step may require time to read all devices. In addition, it may require energy to read and re-program the memristive devices. Nevertheless, the generally proposed concept may be compatible with both types of architectures, differential and non-differential.

According to one further advantageous embodiment of the method, the device significance of all memristive devices of one synapse may be equal—in particular equal 1—and the memristive devices may have only a binary storage capability. In this case, the weight update may be performed according to:

As long as $|\chi_i| \geq \varepsilon_b$, wherein $\varepsilon_b$ is the binary device granularity, repeating the following steps:

applying a pulse to a selected memristive device, in particular, by the selection clock, decreasing $\chi_i$ by $\text{sign}(\chi_b) * \varepsilon_b$, and selecting a next memristive device, again by the selection clock.

If the condition ($|\chi_i|<\varepsilon_b$) is fulfilled, i.e., the weight update is complete, the following steps are performed:
- converting $\chi_i$ into number of pulses p,
- applying p pulses to device,
- setting $\chi_i=0$, and
- selecting a next memristive device, i.e., by the selection clock.

Also, according to an additionally advantageous embodiment of the method, the memristive devices may only have binary storage capability. Thereby, $\alpha_1$ may equal $\alpha_2$ and, during each synaptic weight update, multiple memristive devices may be updated by multiple pulses as long as $|\chi_i| \geq \alpha_n * \varepsilon_b$. Thereby, $\chi_i$ is decreased according to $\chi_i$-sign $(\chi_i) * \alpha_n * \varepsilon_b$ after an application of every pulse to the respective memristive device n.

The procedure may start with the memristive device N having the highest significance $\alpha_N$ and continuing with memristive devices having sequentially decreasing significance values, i.e., $\alpha_{N-1}, \alpha_{N-2}, \ldots, \alpha_2$, until $\alpha_2$ and using the following procedure with the memristive device with the significant factor $\alpha_1$:
- converting $\chi_i$ into number of pulses p,
- applying p pulses to memristive device 1 with the significant factor $\alpha_1$, and
- setting $\chi_i=0$.

The last two embodiments relate to memristive devices having binary storage capacity. However, a comparison with the more general embodiments above shows that very similar procedures for weight updates of the synapses may be followed.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
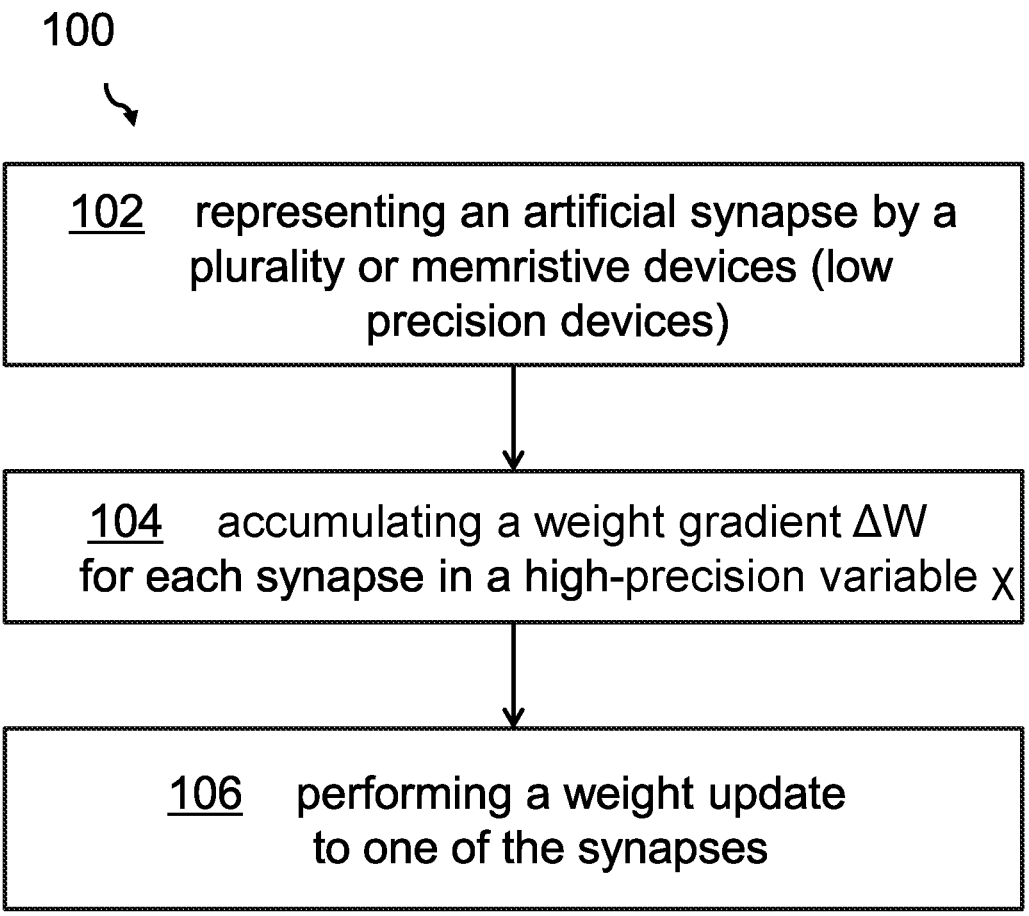

Preferred embodiments of the invention will be described, by way of example only, and with reference to the following drawings:

FIG. 1 shows a block diagram of an embodiment of the inventive computer-implemented method for mixed-precision deep learning with multi-memristive synapses.

Figure 2:
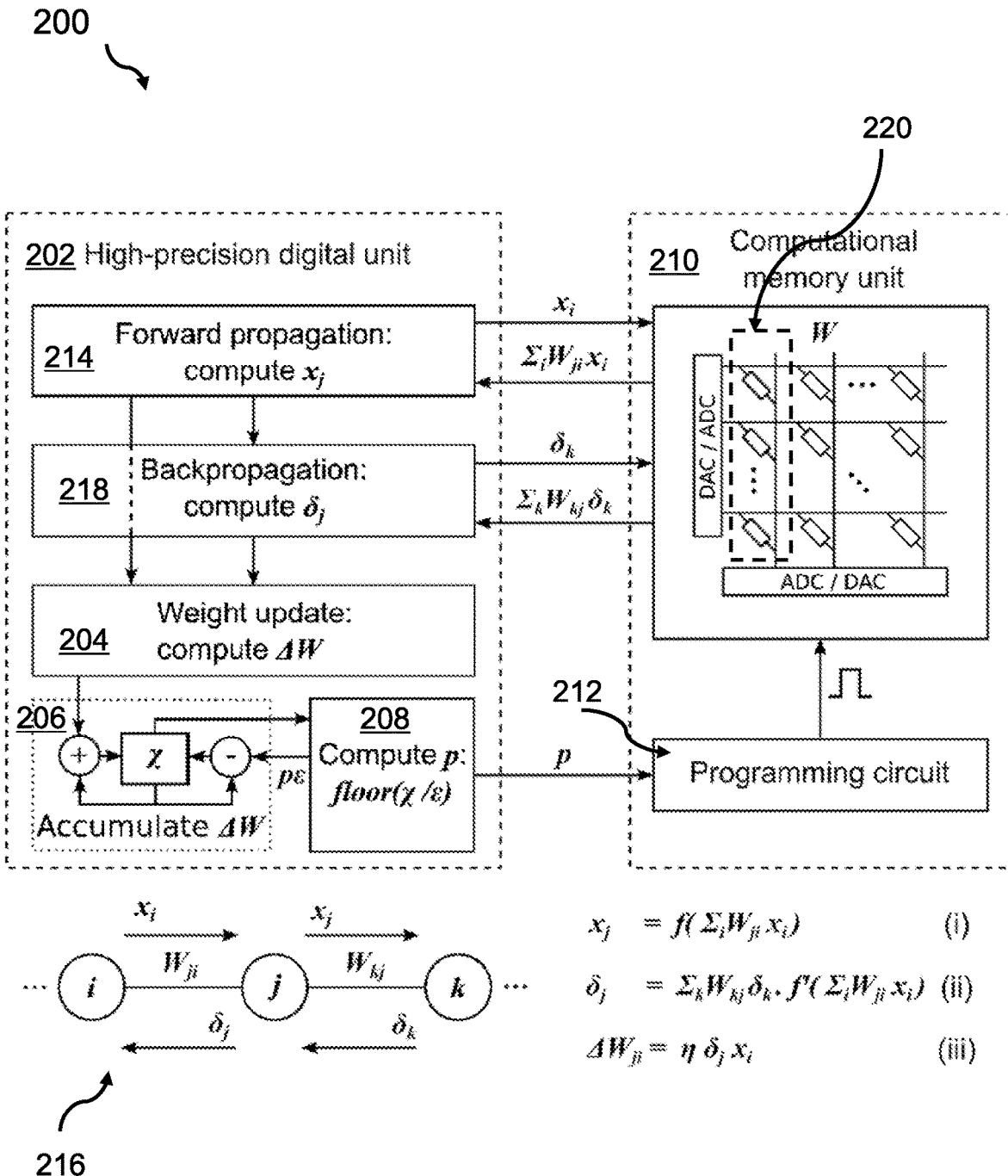

FIG. 2 illustrates a block diagram of the general concept of a mixed-precision computational memory approach for an artificial neural network, e.g., a deep neural network.

Figure 3:
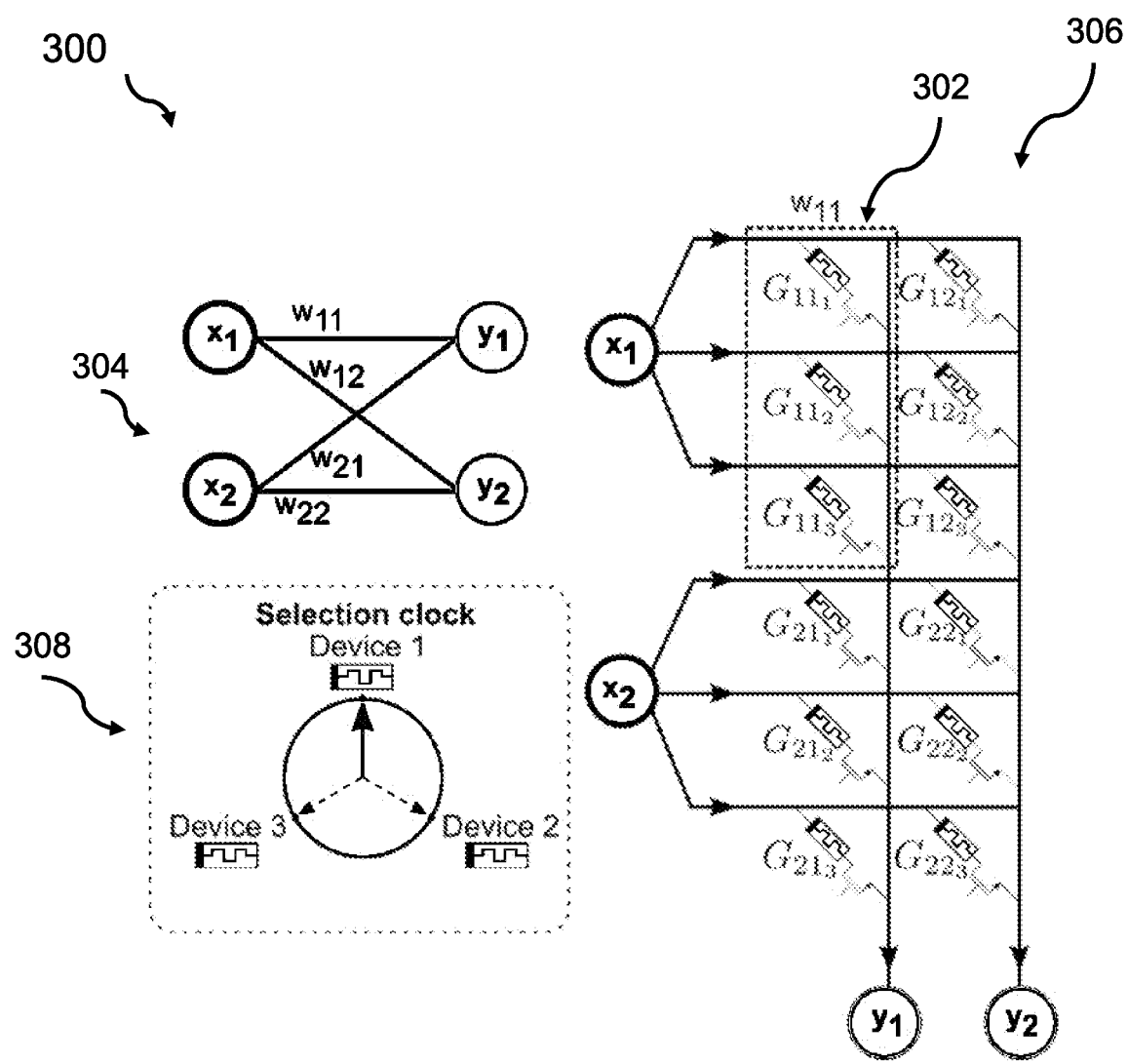

FIG. 3 shows a block diagram of how a small array of artificial synapses composed of three memristive devices each can be implemented.

Figure 4:
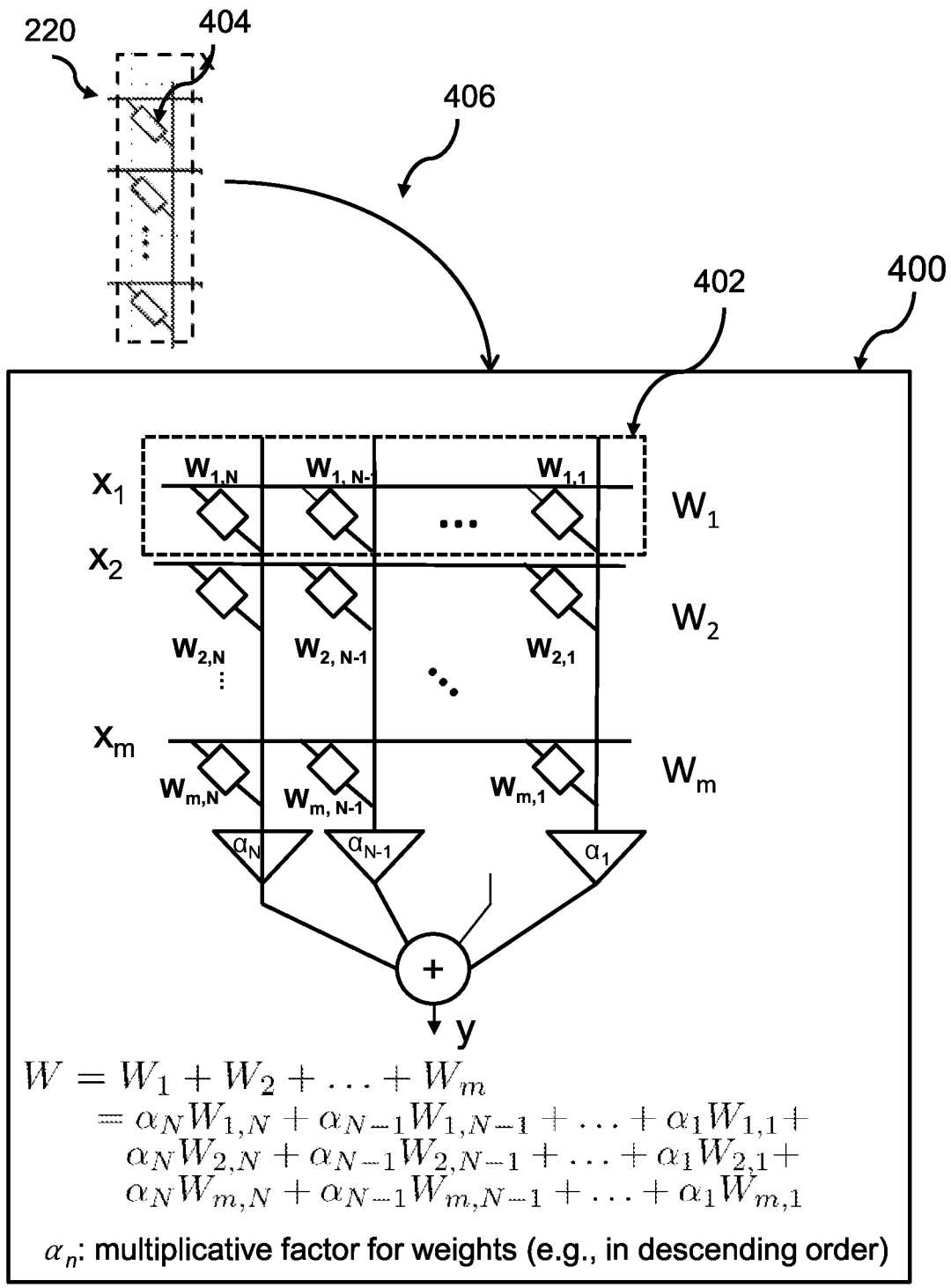

FIG. 4 shows a combination of the concepts shown in FIG. 2 and FIG. 3.

Figure 5:
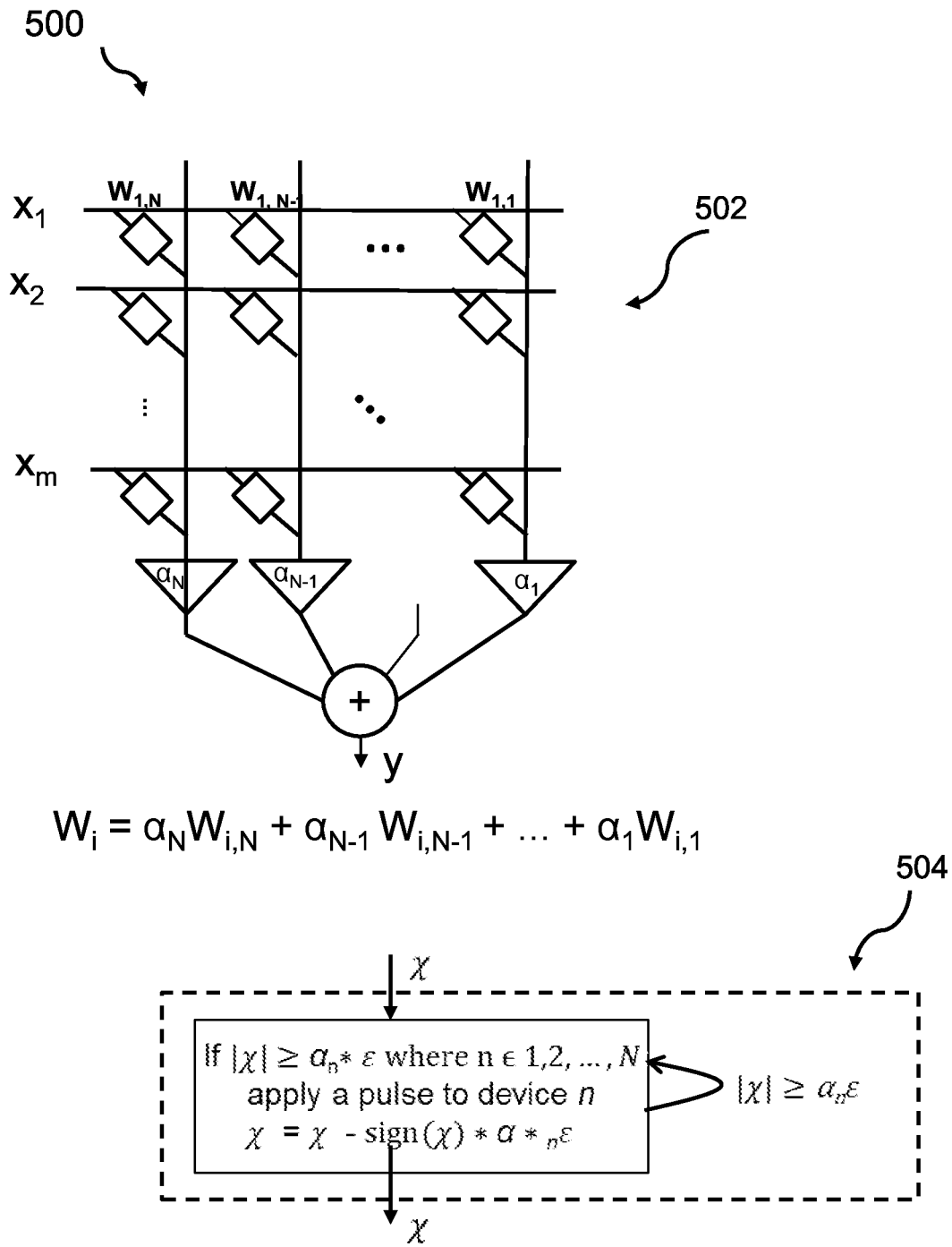

FIG. 5 shows an example of a network of rows of memristive devices which may be addressed individually.

Figure 6:
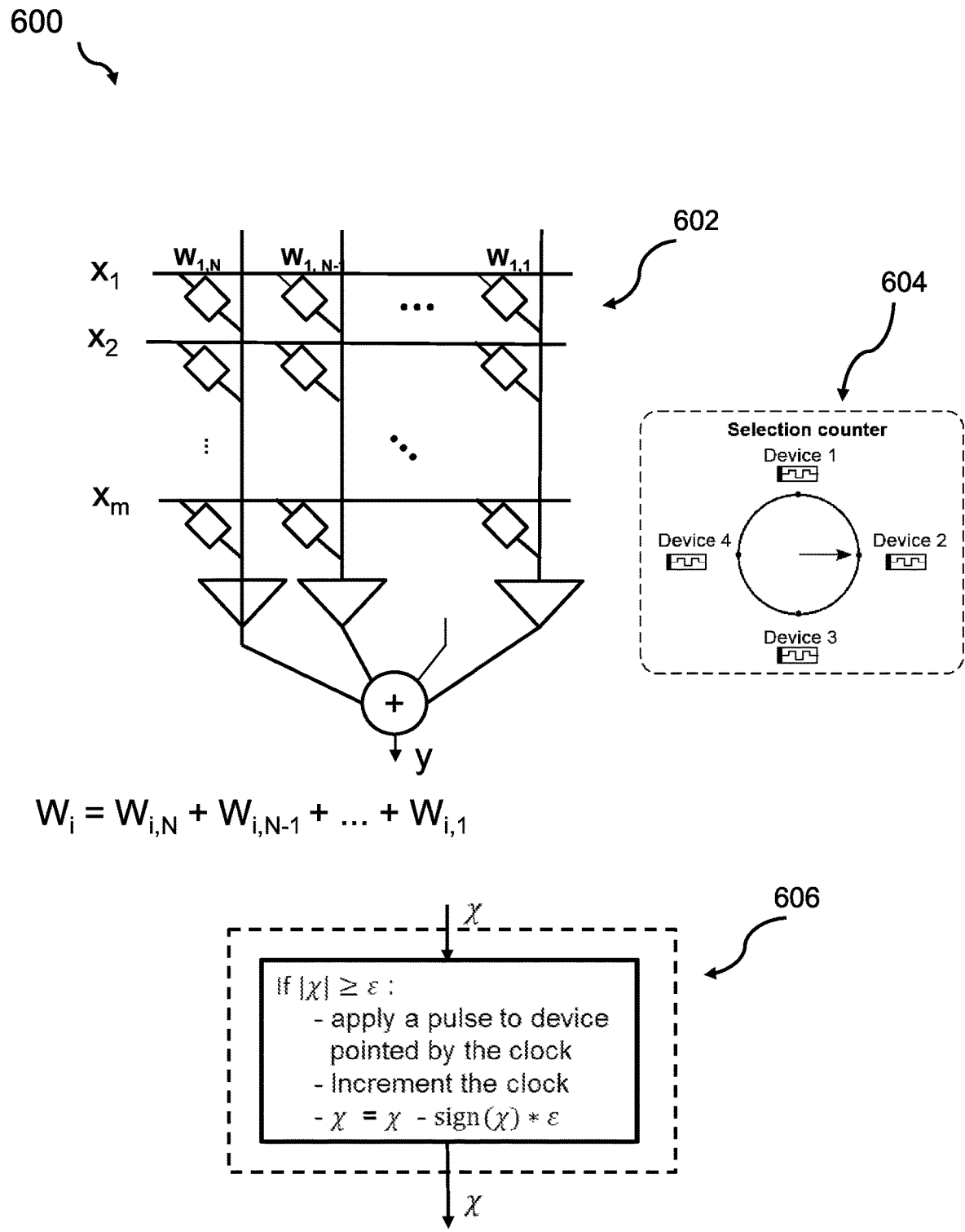

FIG. 6 shows a simple example of a matrix of memristive devices with equal significance values.

Figure 7:
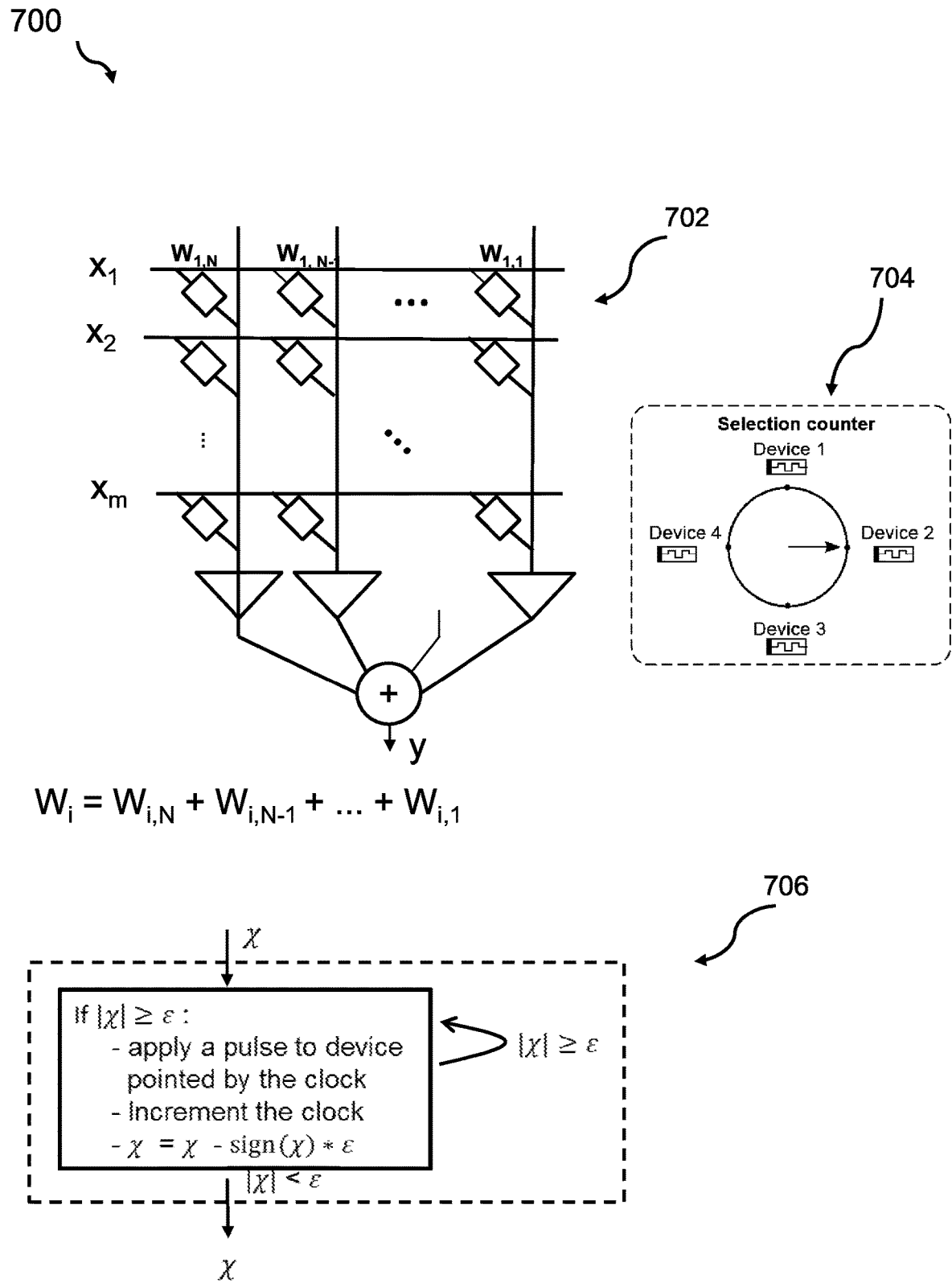

FIG. 7 shows a relatively simple embodiment of a matrix of memristive devices, also with equal significance values.

Figure 8:
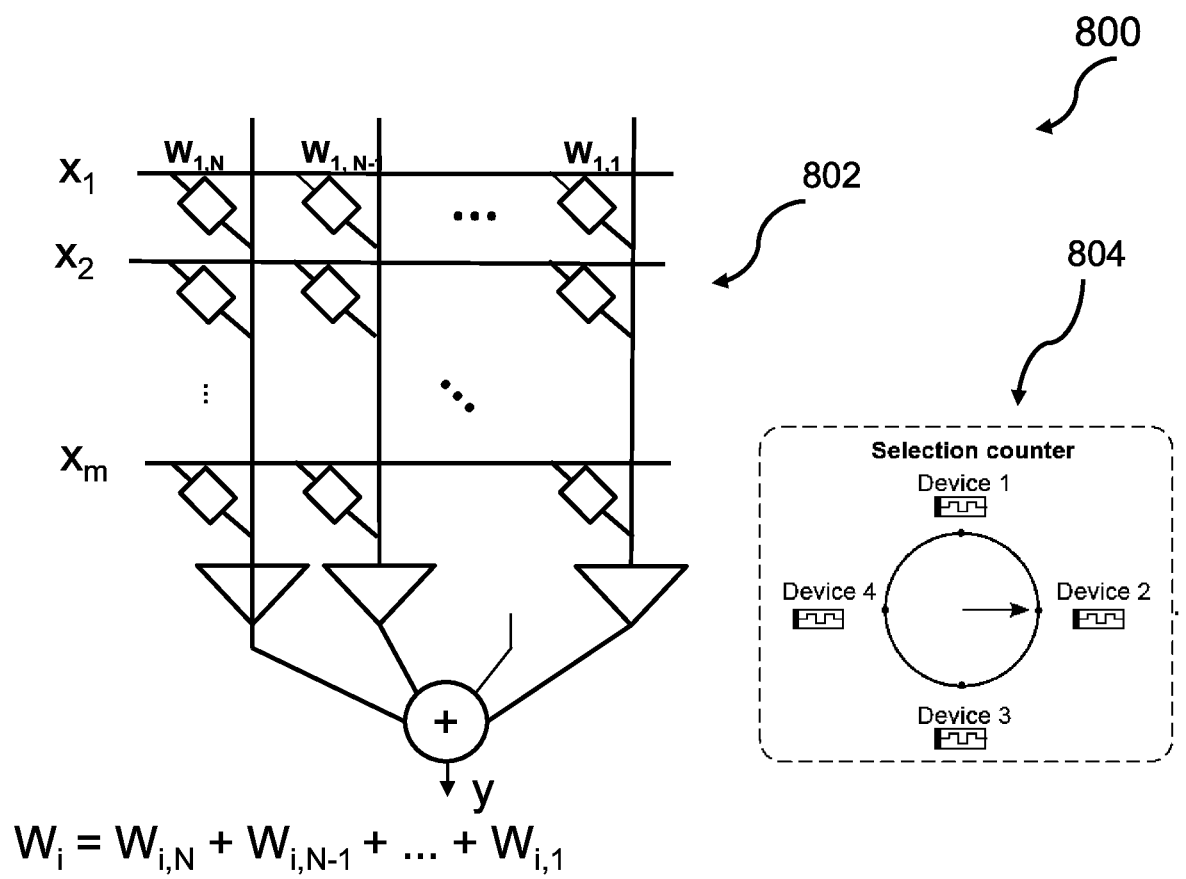
Figure 8:
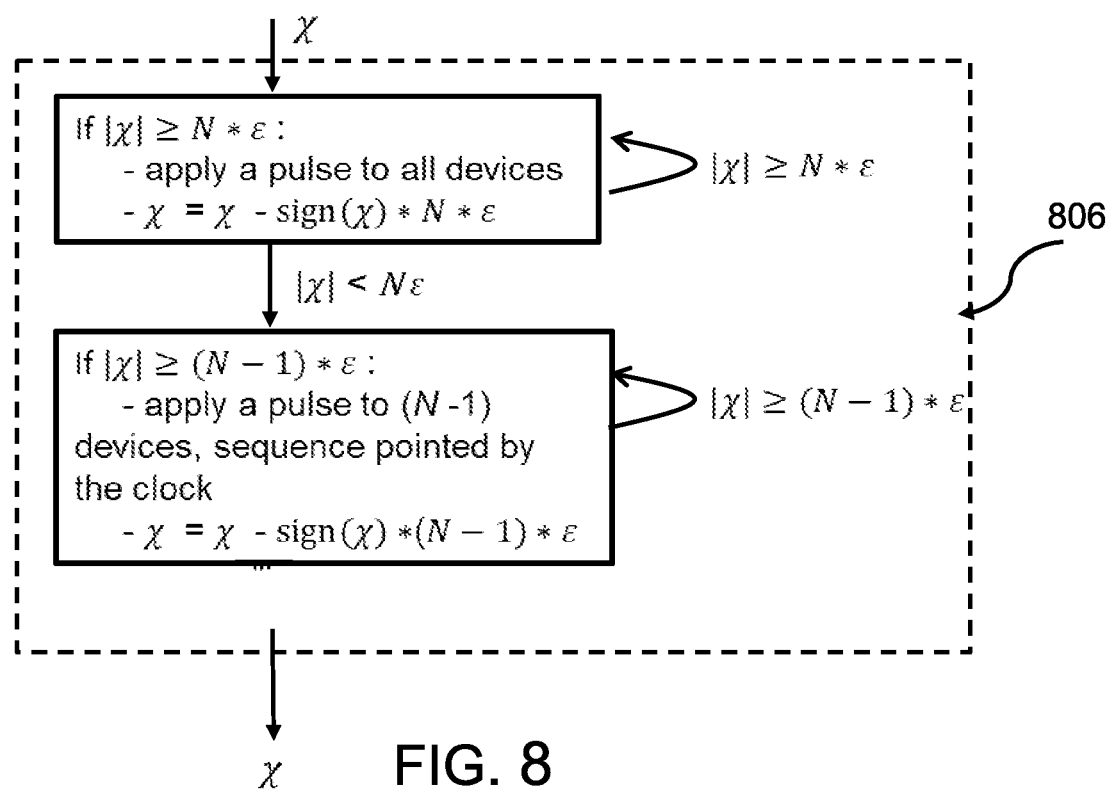

FIG. 8 shows another relatively simple embodiment of a matrix of memristive devices, also with equal significance values.

Figure 9:
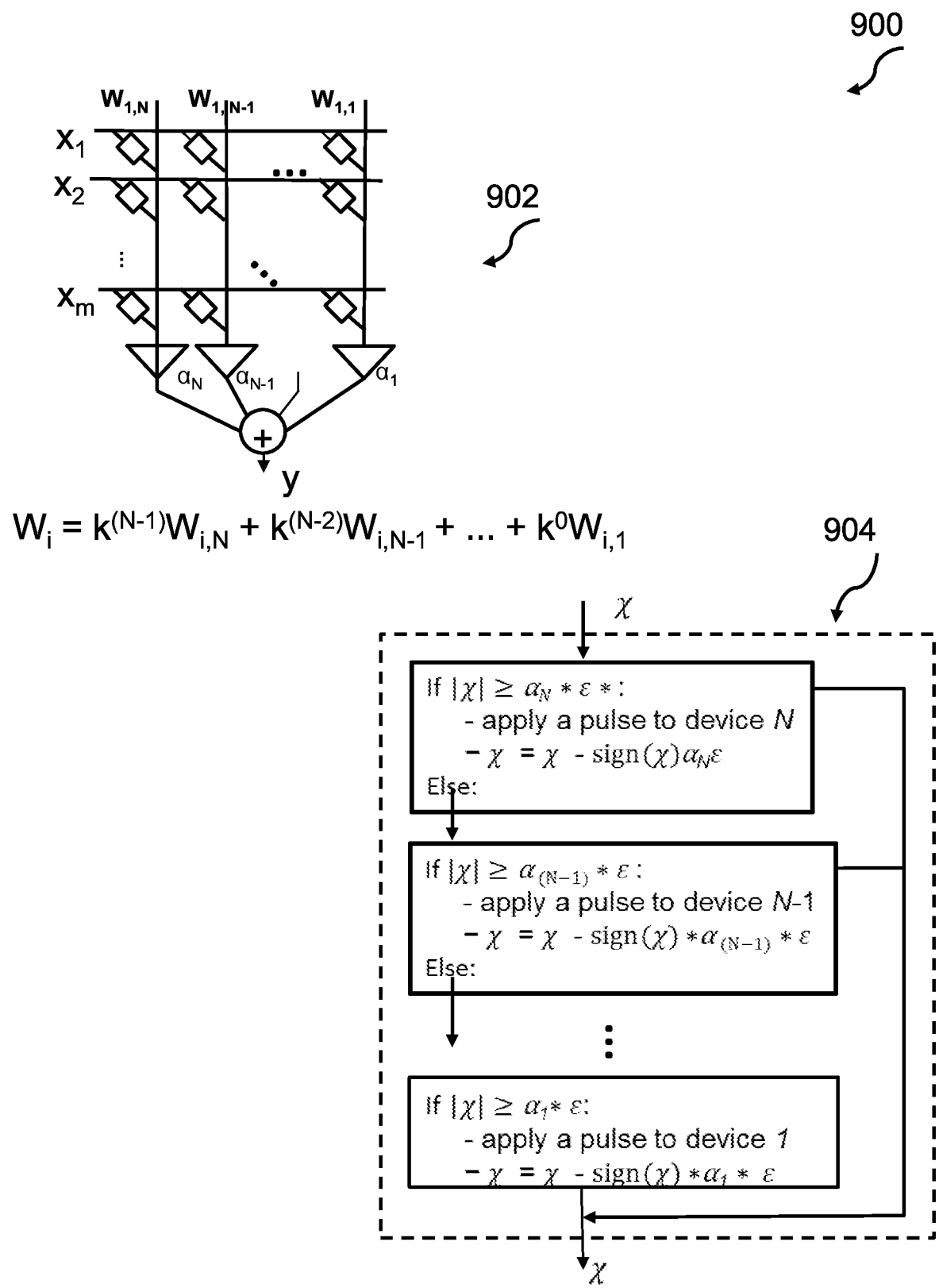

FIG. 9 shows a first embodiment of a matrix of memristive devices with unequal significance values.

Figure 10:
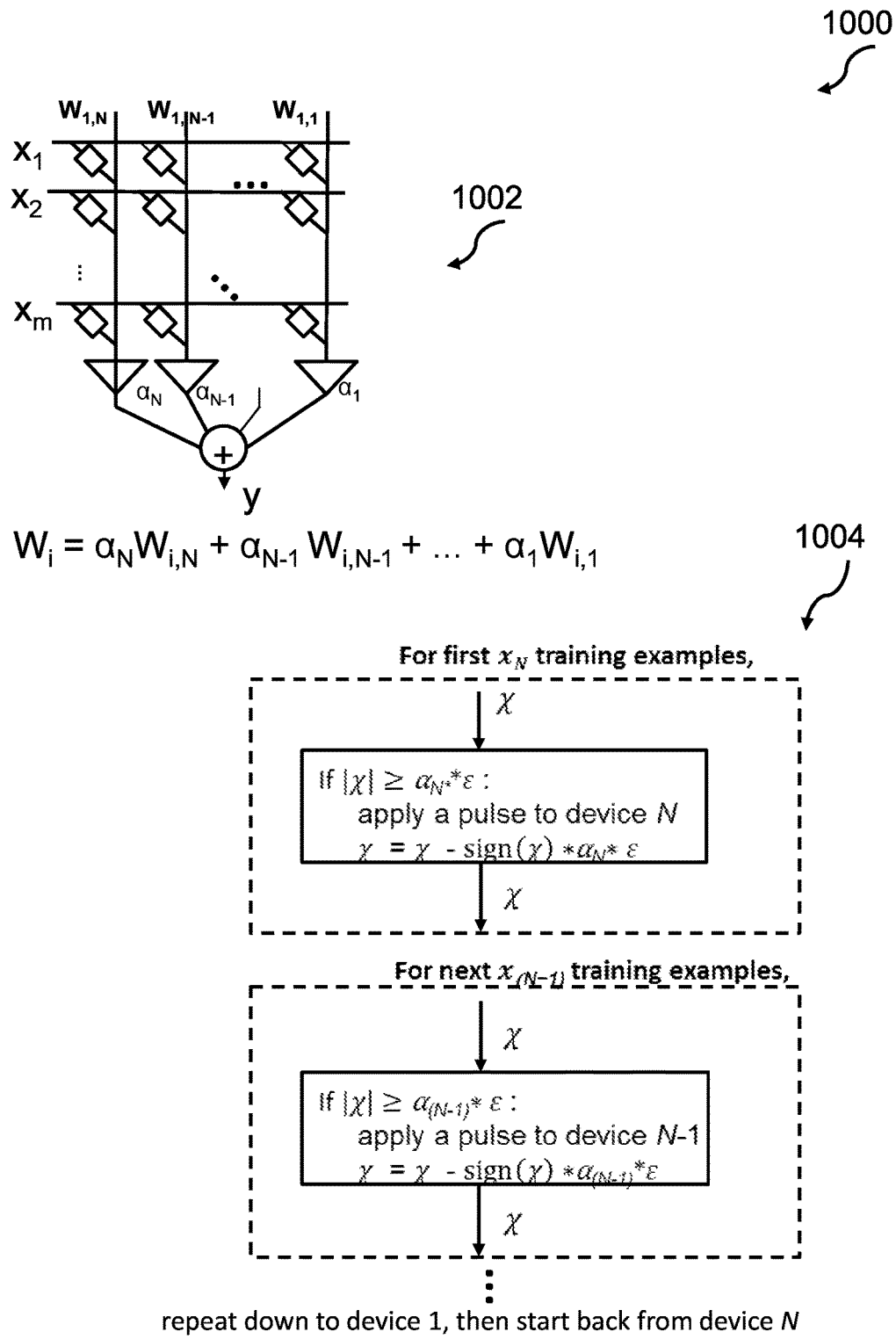

FIG. 10 shows a second embodiment of a matrix of memristive devices with unequal significance values.

Figure 11:
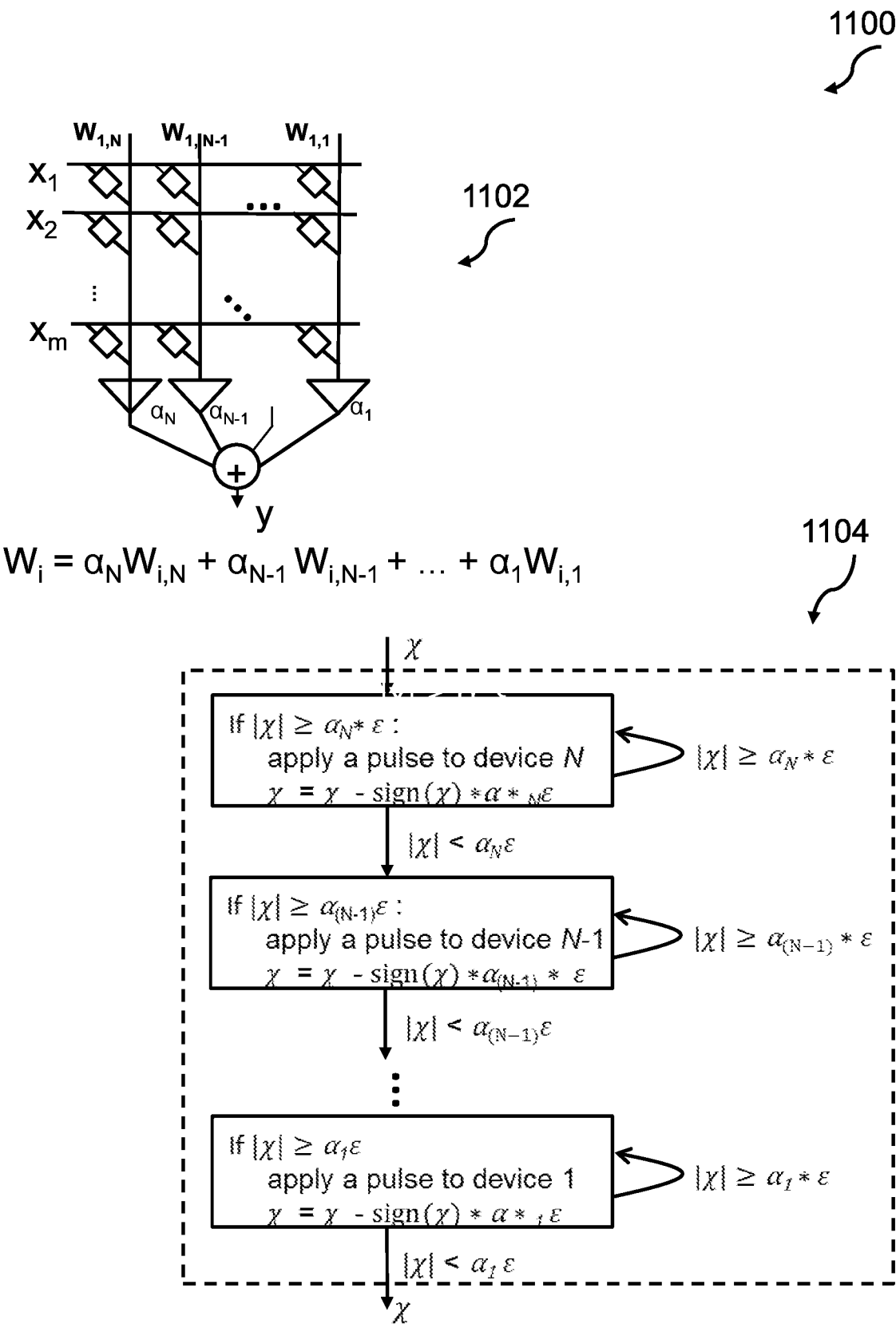

FIG. 11 shows a third embodiment of a matrix of memristive devices, with unequal significance values.

Figure 12:
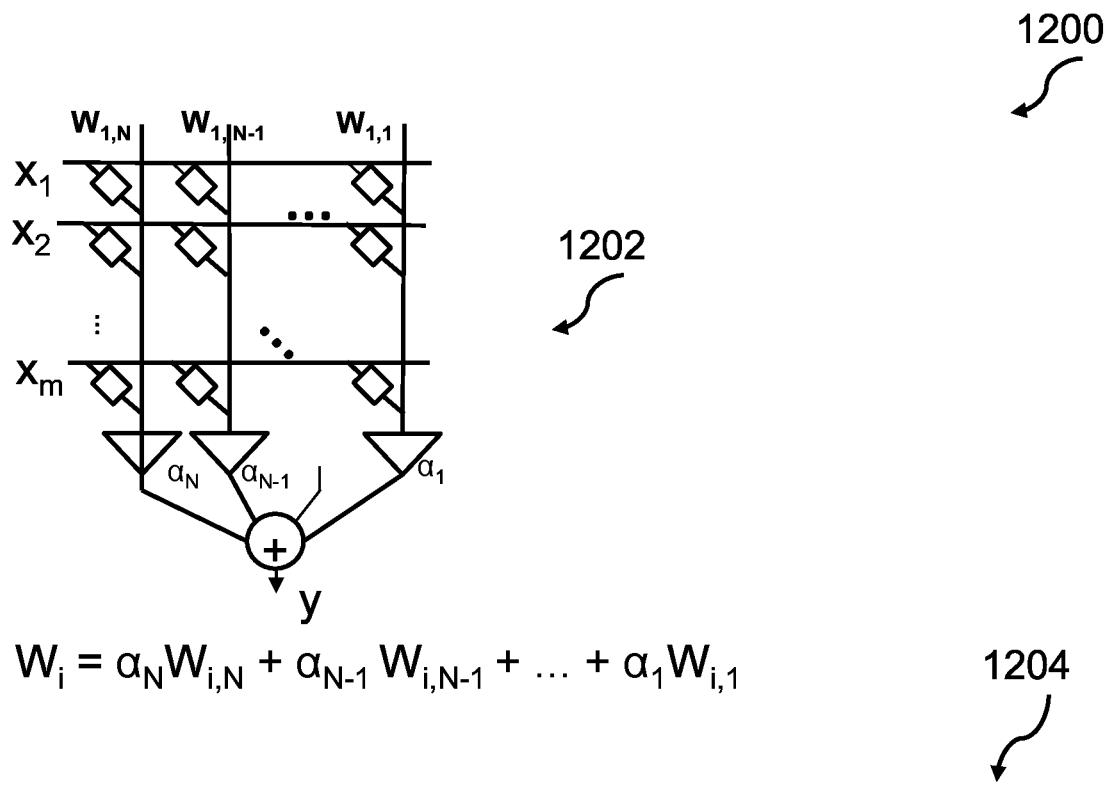
Figure 12:
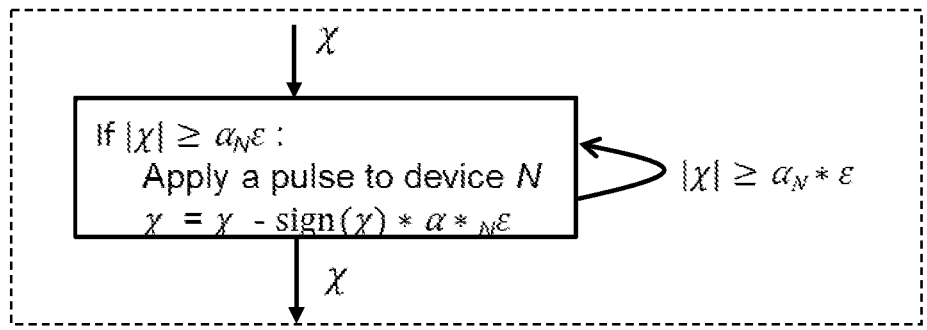
Figure 12:
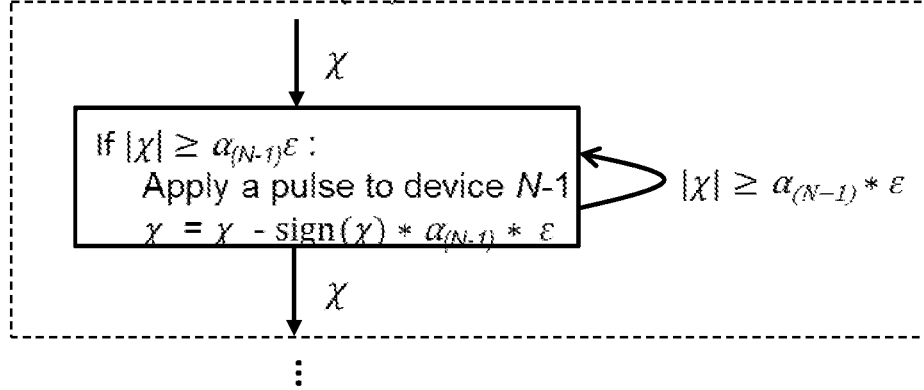

FIG. 12 shows a fourth embodiment of a matrix of memristive devices with unequal significance values.

Figure 13:
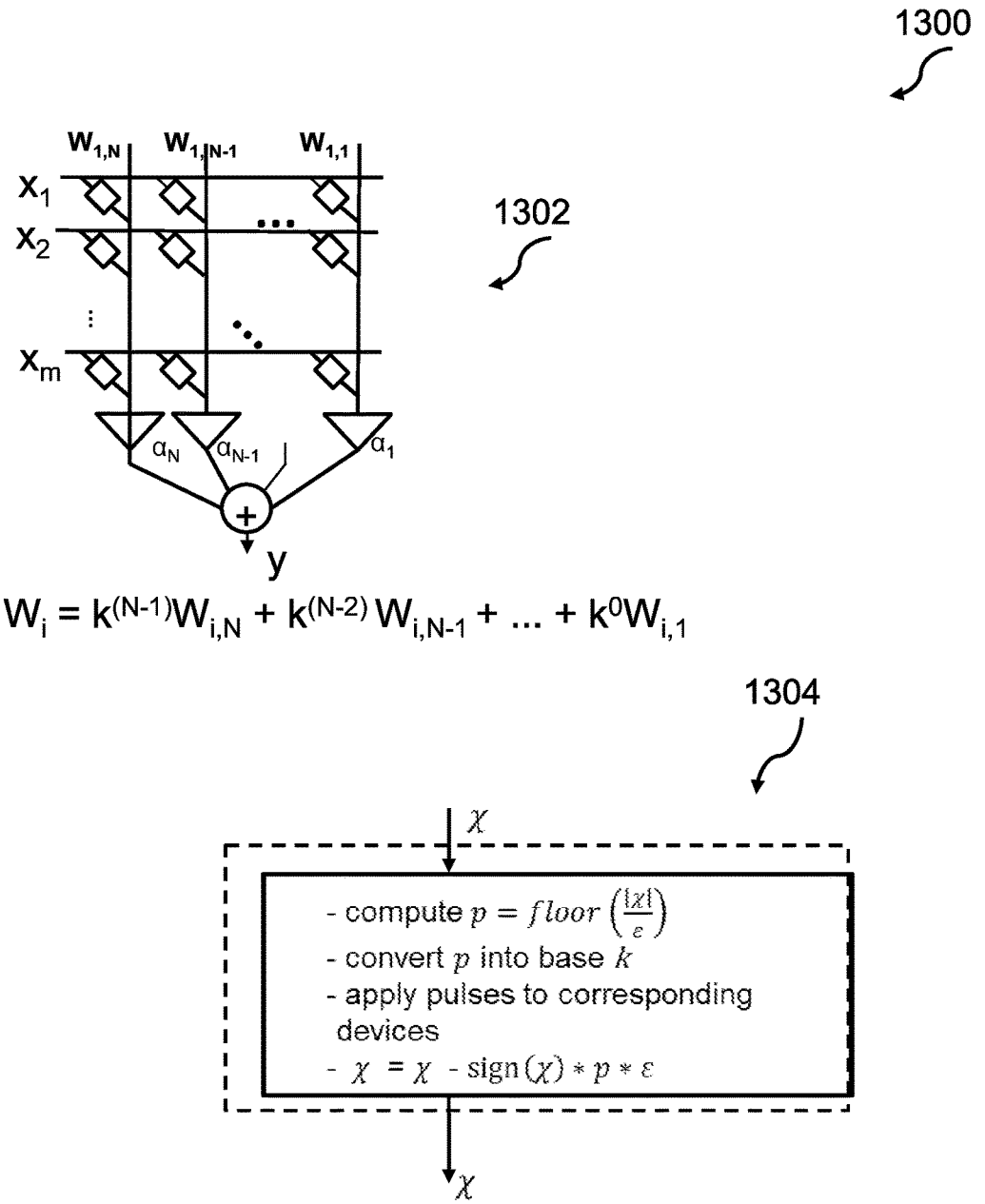

FIG. 13 shows a fifth embodiment of a matrix of memristive devices with unequal significance values.

Figure 14:
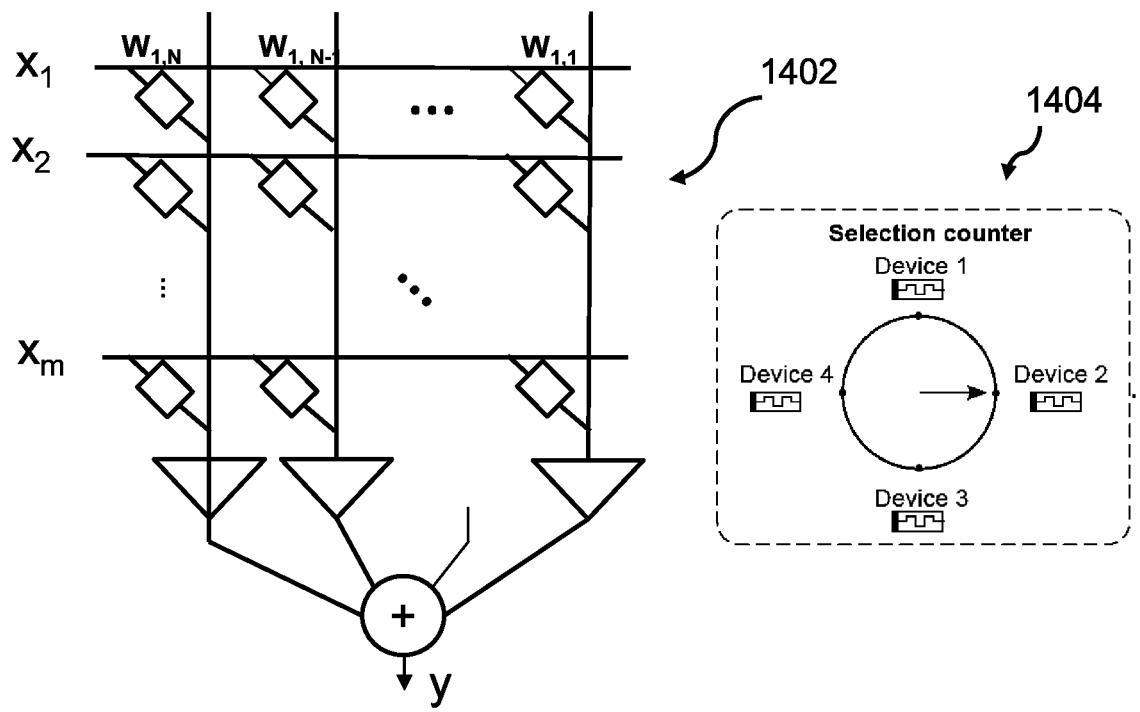
Figure 14:
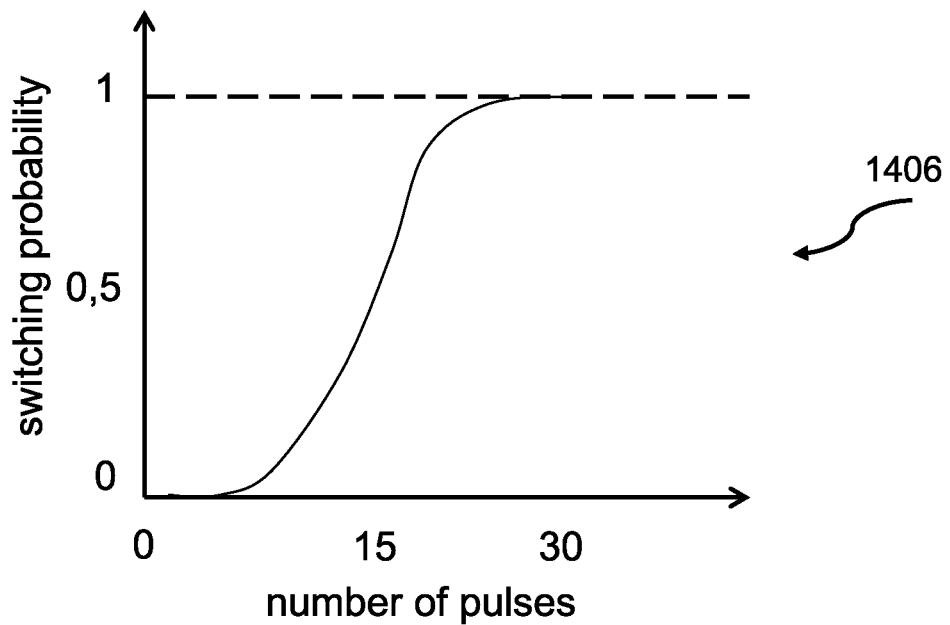

FIG. 14 shows a similar figure as in the beginning of the sequence of algorithms proposed.

Figure 14A:
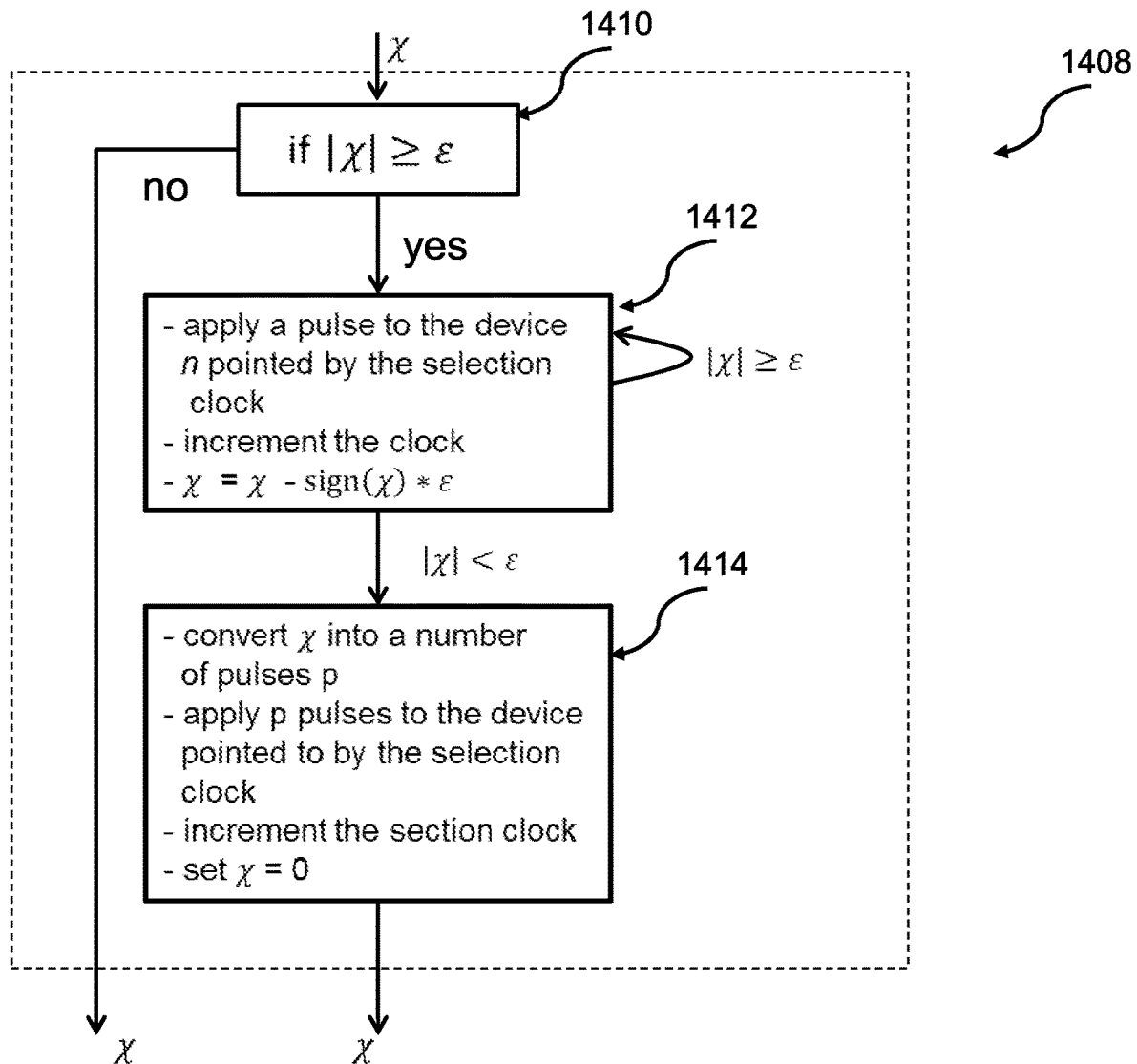

FIG. 14a shows a flowchart for an embodiment for probabilistic switching of memristive devices.

Figure 15:
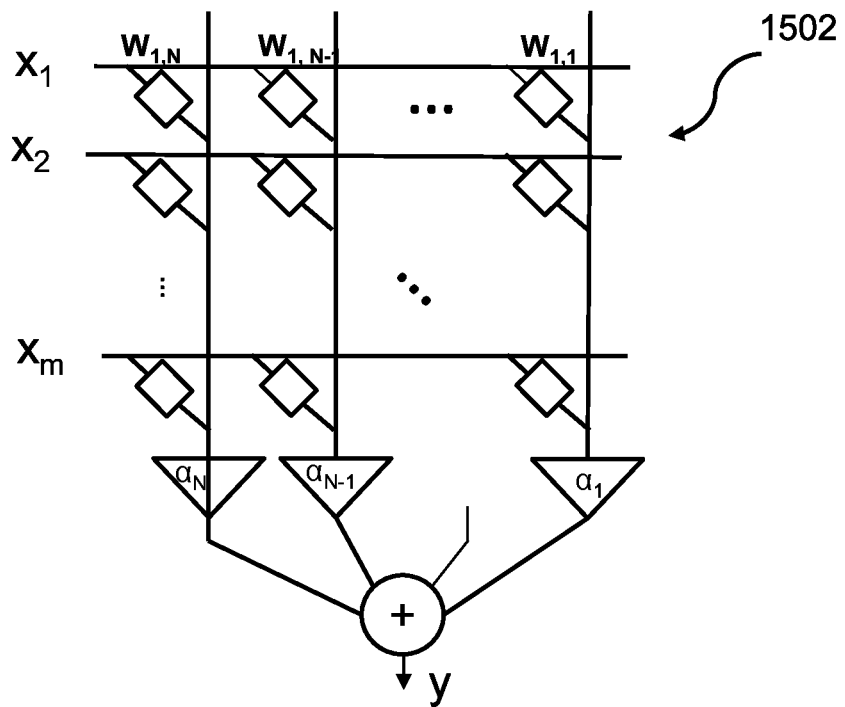
Figure 15:
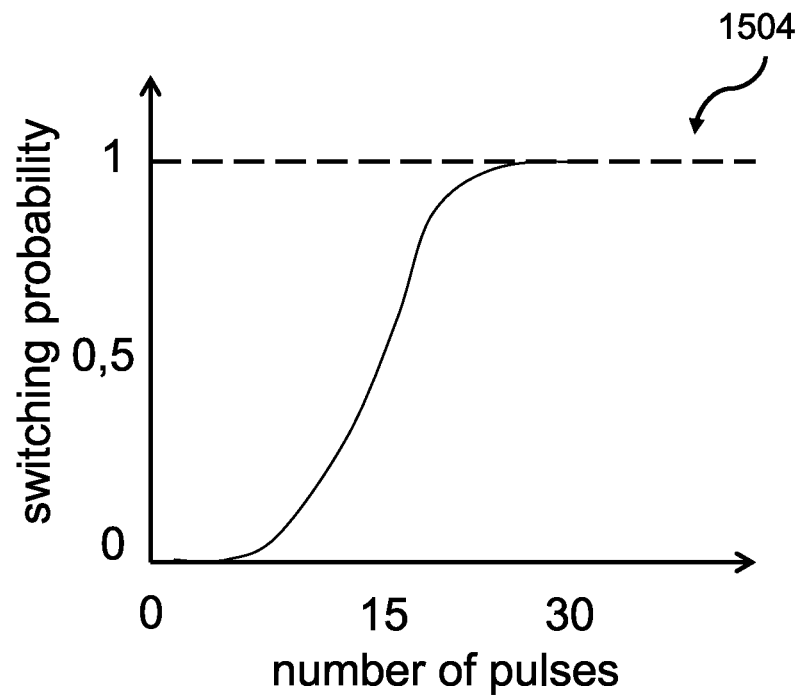

FIG. 15 shows another similar figure as earlier in the sequence of algorithms proposed.

Figure 15A:
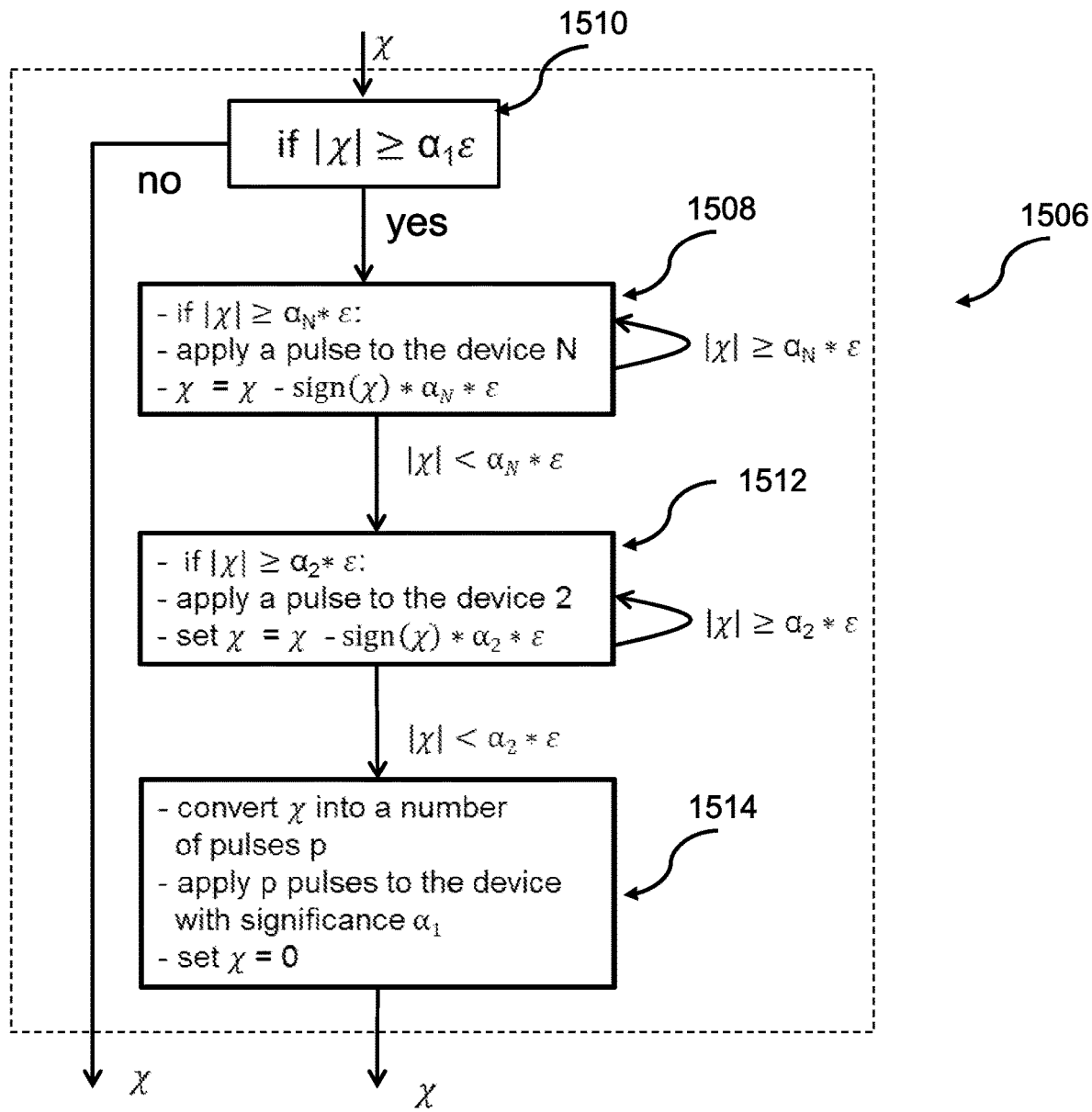

FIG. 15a shows a flowchart of an embodiment relating to the conditions outlined in FIG. 15.

Figure 16:
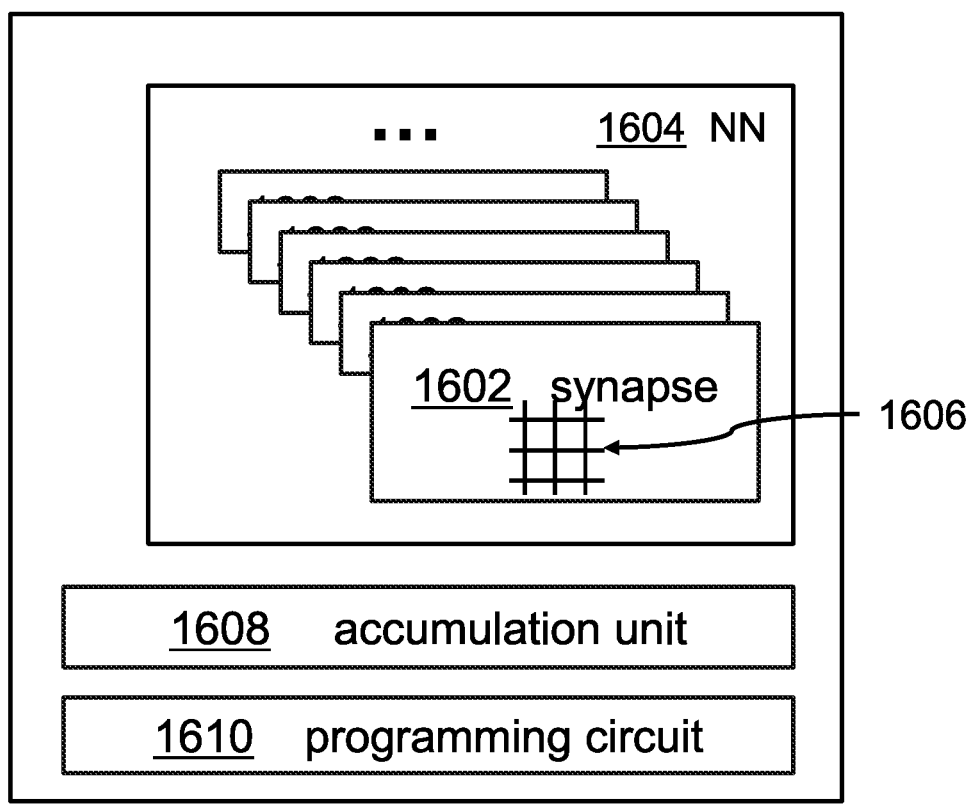

FIG. 16 shows a block diagram of an embodiment of a system for mixed-precision deep learning with multi-memristive synapses.

Figure 17:
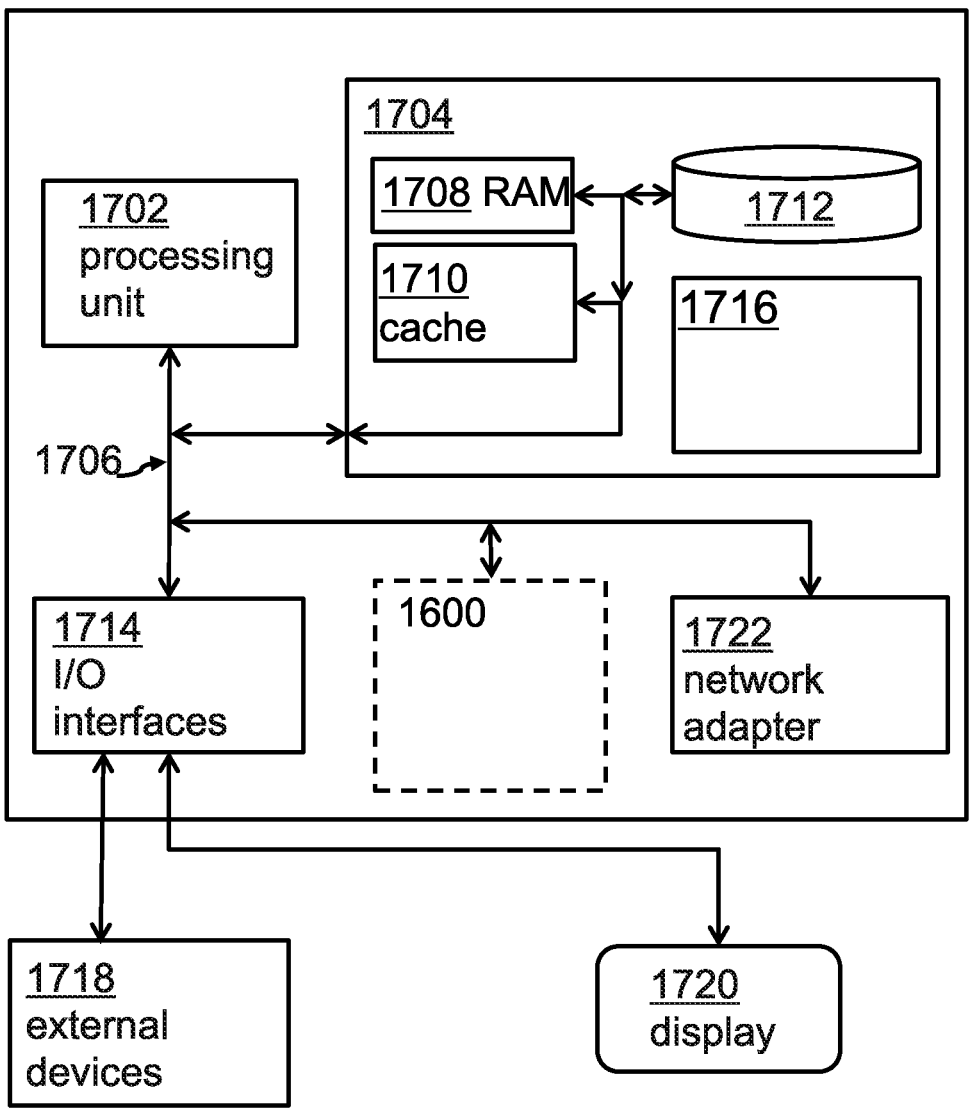

FIG. 17 shows an embodiment of a computing system comprising the system for mixed-precision deep learning with multi-memristive synapses.

DETAILED DESCRIPTION

In the context of this description, the following conventions, terms and/or expressions may be used:

The term 'mixed-precision deep learning' may denote a method relating to a training of an artificial neural network, in particular a deep neural network, in which devices may be used that do not all work with same mathematical precision. Some of the devices may have the characteristic to represent variables only a relatively low precision, e.g., with a mathematical procession below 16-bits, and other devices may have the characteristic for representing variables with a relatively high mathematical precision, e.g., equal of larger than 16 bits.

The term 'multi-memristive synapses' may denote artificial synapses as part of a neural network, wherein each synapse may be implemented using a plurality of memristive devices.

The term 'artificial neural network' may denote a network of a population of artificial, i.e., simulated, neurons interconnected by artificial, i.e., simulated, synapses to carry out a specific function when activated. Neural networks of neural circuits may interconnect to one another to form large scale, artificial brain networks. Biological neural networks have inspired the design of artificial neural networks. Artificial neural networks may be trained, with a training data set in order to generate an output, reflecting the training, to a new, unknown input.

The term 'memristive devices' may denote a semiconductor device (a portmanteau of memory resistor) may be a non-linear passive two-terminal electrical component relating electric charge and magnetic flux linkage. According to the characterizing mathematical relations, the memristor operates in the following way: the memristor's electrical resistance is not constant but depends on the history of current that had previously flowed through the device, i.e., its present resistance depends on how much electric charge has flowed in what direction through it in the past; the device remembers its history. When the electric power supply is turned off, the memristor remembers its most recent resistance until it is turned on again—the so-called non-volatility property. Typically, memristors may be implemented using $TiO_2$. Other implementation materials are also known, e.g., chalcogenide such as GST (germanium-antimony-tellurium), disposed between a pair of electrodes providing the cell terminals. Typically, an amorphous phase of the material may represent a high-resistance and a low-resistance may be represented by a crystalline state of the material. Memristive devices being able to represent not only binary states, but multiple states in one device, may achieve this through a changing mixture between a crystalline state of the material and amorphous state of the material.

The term 'synaptic weight' may denote generally a strength or amplitude of a connection between two nodes, in particular, in biology, as well as in artificial neurons and artificial synapses, to the amount of influence the "firing" of one of the neurons has on another.

The term 'device significance' may denote a mathematical real value relating to a memristive device. Thus, a synapse comprising a plurality of memristive devices, wherein each memristive device may have a different significance value for the contribution to the overall synaptic function.

The term 'high-precision variable' may denote in the context of this document, a variable which may be digitally representable with a mathematical precision of, e.g., more than 16 bits.

The term 'weight update' may denote a step in the training of a neuron network, in which a weight of the synapse may be updated by way of forward and backward propagation.

The term 'arbitration scheme' may denote an algorithm according to which updates (i.e., decrease values or increase values) to memristive devices may be implemented. The arbitration scheme may be implemented using a selection clock and programming circuits for the memristive devices.

The term 'device granularity' may denote a sensitivity or resolution of a memristive device. Given the limited precision according to which memristive devices may function, the device granularity may be lower than digitally determined weight updates for a synapse. Hence, applying an update to a memristive device, wherein the update relates to a smaller value than the device's granularity may be useless, because the preciseness in representing different values of the memristive device is not high enough.

The term 'binary memristive devices' may denote a memristive device, i.e., only representing to binary statuses, i.e., "0" and "1". In binary memristive devices, the switching probability may be adjusted through the number of pulses applied (assumed one may have the minimum weight, the number of pulses implies the probability to switch to the maximum weight).

The term 'analog resistive devices' may denote a memristive device, allowing a larger number of resistor/resistive values. Thus, an analog resistive device may represent more than two statuses in one memristive device.

In the following, a detailed description of the figures will be given. All instructions in the figures are schematic. Firstly, a block diagram of an embodiment of the inventive computer-implemented method for mixed-precision deep learning with multi-memristive synapses is given. Afterwards, further embodiments, as well as embodiments of the system for mixed-precision deep learning with multi-memristive synapses, will be described.

FIG. 1 shows a block diagram of an embodiment of the computer-implemented method 100 for mixed-precision deep learning with multi-memristive synapses. The method comprises representing, 102, each synapse of an artificial neural network by a combination of a plurality of memristive devices. Each of the plurality of memristive devices of each of the synapses contributes to an overall synaptic weight with related device significance. The memristive devices may represent the low precision devices.

The method comprises accumulating, 104, a weight gradient $\Delta W$ for each synapse in a high-precision variable $\chi$, in particular, a high-precision variable $\chi$ being represented digitally with a precision of at least 16 bits or higher. The weight update follows typical forward and backward propagation during a training of the artificial neural network. The accumulation 104 may be performed by an accumulation unit operating in high precision, e.g., more than 16 bits.

The method 100 comprises further and performing, 106, a weight update to one of the synapses using an arbitration scheme for selecting a respective memristive device, according to which a threshold value related to the high-precision variable $\chi$ for performing the weight update is set according to the device significance of the respective memristive device selected by the arbitration schema. Thus, the memristive devices represent the low precision portion and the weight update calculation represents a high precision portion within the method.

FIG. 2 illustrates a block diagram 200 of the general concept of a mixed-precision computational memory approach for an artificial neural network, e.g., a deep neural network. Determining the related weight update $\Delta W$ and accumulating $\Delta W$ is generally performed in the units 204 and 206, whereby the pulse generation unit 208 determines the number and polarity of pulses required for the memristive devices in the computational memory unit 210, in particular for a usage by the programming circuit 212 representing the low precision unit of the mixed-precision deep learning environment.

The forward propagation unit 214 is instrumental for computing output signals $x_j$ of a specific neuron based on an input signal $x_i$, wherein the output signal calculation is based on the general function (i) of FIG. 2. The weighted sum of inputs is performed in the computational memory unit 210 and returned to the forward propagation unit 214 for a calculation of $x_j$.

The partial diagram 216 symbolizes circled neurons i, j, k of three layers of the deep neuron network with weight $W_{ji}$ and $W_{kj}$ and related error terms $\delta$ according to $\delta_j = f'W_{kj}\delta_k f'$ ($\Sigma W_{ij}x_1$) [compare (ii)], which is calculated in the back-propagation determination unit 218. The weighted sum of the error terms are performed in the computational memory unit 210 and returned to the back-propagation unit 218 for a calculation of $\delta_j$.

As can be recognized by a skilled person, the weight updates $\chi$ are accumulated in high precision in the high precision digital unit 202 and they are only applied if the weight update is larger than the minimum device granularity $\varepsilon$. Thus, the number of pulses p can be applied according to the size of the weight update, as illustrated in unit 208. It may also be noted that $\chi$ is updated after a weight update as $\chi_{ij,\ new} = \chi_{ij,\ current} - p*\varepsilon$. In general, the weight update $W_{ij}$ is determined according to $$\Delta W_{ij} = \eta \delta_j x_i [\text{compare (iii)}], \text{ wherein } \eta \text{ is a learning rate parameter.}$$

FIG. 3 shows a block diagram 300 of how a small array 304 of artificial synapses, each one composed of three memristive devices each (see dashed box), can be implemented. Symbolically, source neuron $x_1$, $x_2$ are shown together with destination neurons $y_1$, $y_2$. Between these neurons, artificial synapses ($w_{11}$, $w_{12}$, $w_{21}$, $w_{22}$) are shown. For example, synapse 302 sits between neuron $x_1$ and neuron $y_1$. It is shown with weight $w_{11}$. With the shown array 306 of memristive devices, the simplified neuron network 304 may be implemented. The weights of the synapses between the neurons are symbolically shown as $w_{11}$, $w_{12}$, $w_{21}$, $w_{22}$.

For the programming of the memristors of each of the four multi-resistive synapses, a selection clock 308 is symbolically shown. In each step, the pointer of the selection clock 308 moves one step forward in a clockwise direction, each time addressing another one of the individual memristive devices of the respective synapse. Thus, as an example, the selection clock 308 can address the memristors $G_{11,\ 1}$, and $G_{11,\ 2}$, $G_{11,\ 3}$ sequentially, whereby $G_{11}$ 302 represents the synapse $w_{11}$ between neuron $x_1$ and $y_1$.

Thus, the four shown synapses are realized using to the memristive devices $G_{11,\ 1}$ to $G_{22,\ 3}$ and the weights of the individual synapses are here realized by a combination of three memristors. It may be clear to a skilled person that also other numbers of memristive devices may be used for each individual synapse. It may also be understandable that only a subset of the memristive devices is programmed at any instance. However, more memristive devices of one synapse are read in parallel. Furthermore, a global clock-based arbitration scheme may be used for a device selection and for updating the conductance response curve. Exemplarily, it may be mentioned that a typical potentiation pulse may have a width of 50 ns with about 100 µA. The individual memristive devices of a synapse may have different sub-weight factors building the total weight of a synapse (not shown in this figure).

FIG. 4 combines the concepts shown in FIG. 2 and FIG. 3. FIG. 4 shows a block diagram of an expanded array 400 of memristive devices $W_{1,N}$ . . . $W_{m,1}$ with weight factors $\alpha_N$, . . . $\alpha_1$. The array column 220 (compare FIG. 2) of the computational memory unit 210 (also compare FIG. 2, as well as respective other columns) can be expanded into an array 400 comprising the memristors $W_{1,N}$ . . . $W_{m,1}$ at each cross point representing—if addressed correctly—a total weight W of the respective synapses. Consequently, row 402 represents (indicated by arrow 406) the top left synapse 404 of column 220. Hence, every row of the array 400 represents one synapse 404 of the column 220.

Additionally, different significance values (or multiplicative factors) $\alpha_N$, $\alpha_{N-1}$, . . . , $\alpha_1$ are shown as part of the matrix 400. The total weight $W_i$ of a synapse can then be summed up as in $W_i = \alpha_N W_{i,N} + \alpha_{N-1} W_{i,N-1} + \ldots + \alpha_1 W_{i,1}$. Thus, individual memristive devices contribute to the overall weight $W_i$ of a respective synapse with different sub-weights depending on the significance factor of each individual memristive device. Thereby, it may be mentioned that the cell characteristics of the memristive devices are practically identical, meaning that the memristive devices are not designed to have different electrical characteristics, apart from their manufacturing and natural physical variances.

The proposed concept can be implemented using binary or other local memristive devices. It can also be used for a potentiation and depression of memristive devices, regardless of the conductance response asymmetry. It also has a potential advantage in a grid if PCM (phase change memory) devices are used as binary devices. Furthermore, this approach can be used to achieve probabilistic switching through crystallization.

FIG. 5 shows a general example 500 of a network 502 of memristive devices $W_{1,N}$ to $W_{1,1}$, $W_{2,N}$ to $W_{2,1}$ according to rows $x_1$, $x_2$, . . . , $x_m$, which may be addressed individually. In the shown example, a weight significance value of the different memristive devices may be equal, e.g., $\alpha_N$, $\alpha_{N-1}$, . . . , $\alpha_1 = 1$, or unequal. The output of the selected memristive devices are then according to the significance summed, delivering an output value y. Generally, a weight update $\Delta W$ for a synapse relating to the high precision variable $\chi$ may be performed memristive device for memristive device in a loop process (compare 504) if the condition $|\chi| \geq \alpha_n^* \varepsilon$ is met. After each pulse to a device, an $\chi_{next}$ is set to a value of $\chi_{current} - \text{sign}(\chi_{current}) * \alpha_n^* \varepsilon$, wherein $\alpha_n$ is the significance value of the memristive device n and $\varepsilon$ is a related granularity of the device. The selection of the devices to be updated can be done according to a variety of different schemas during a training of a related neural network, which will be shown in the following more detailed embodiments.

FIG. 6 shows a simple example 600 of a matrix 602 of memristive devices in which each of the memristive devices has a weight $W_{i,n}$, $n \in 1, 2, \ldots, N$, and contributes to the overall weight of a single synapse $W_1$ with a multiplication factor $\alpha_N = \alpha_{N-1} = \ldots = \alpha_1 = 1$ (equal significance). Thus, the overall synaptic weight $W_i$ is calculated as $W_i = W_{i,N} + W_{i,N-1} + \ldots + W_{i,1}$.

During a weight update, if the condition $|\chi| \geq \varepsilon$ is fulfilled, one pulse is applied to the device pointed by the selection clock 604. After that, $\chi$ is decreased according to $\chi_{new} = \chi_{current} - \text{sign}(\chi_{current}) * \varepsilon$ (compare 606). The selection clock can be incremented after every weight update or after a predefined number of training examples. It may also be noted that the clock can be incremented after every weight update or after x training examples.

FIG. 7 shows a relatively simple embodiment 700 of a matrix 702 of memristive devices, also with equal significance. The overall synaptic weight $W_i$ is determined in the same way has explained in FIG. 6. Also here, during a weight update, if $|\chi| \geq \varepsilon$, one pulse is applied to the device pointed by the selection clock 704 and $\chi$ is decreased according to $\chi_{new} = \chi_{current} - \text{sign}(\chi_{current}) * \varepsilon$. The selection clock is incremented and if $|\chi| \geq \varepsilon$, a pulse is applied to the memristive device pointed to by the selection clock. This device update cycle is continued until is $|\chi| < \varepsilon$ (compare 706). Also her, the clock can be incremented after every weight update or after x training examples.

FIG. 8 shows another relatively simple embodiment 800 of a matrix 802 of memristive devices, also with equal significance. The difference here is the following: during a weight update, if $|\chi| \geq N * \varepsilon$, a pulse is applied to all devices of the synapse. $\chi$ is decreased according to $\chi_{new} = \chi_{current} -$ sign($\chi$)*N*$\varepsilon$. If $|\chi| \geq N*\varepsilon$, the process continues to apply pulses to all devices of the synapse. When the condition is not satisfied anymore, a determination is made whether $|\chi| \geq (N-1)*\varepsilon$. If the condition is satisfied, (N−1) pulses are one-by-one applied to the memristive devices according to the value of the selection clock 804. Then, the selection clock is incremented after each pulse. Furthermore, $\chi$ is decreased according to $\chi_{new} = \chi_{current} - \text{sign}(\chi_{current})*(N-1)*\varepsilon$ (compare 806). This updating the devices continues with a respective scheme until $|\chi| < \varepsilon$.

FIG. 9 shows a first embodiment 900 of a matrix 902 of memristive devices with unequal significance values, i.e., $\alpha_n \neq \alpha_n \neq 1$. Hence, the weight $W_i$ is determined according to $W_i = \alpha_N W_{i,N} + \alpha_{N-1} W_{i,N-1} + \ldots + \alpha_1 W_{i,1}$. Typically, it may be assumed that $\alpha_N > \alpha_{N-1} > \ldots > \alpha_1$. During each synaptic update only one device is updated out of N devices. During a weight update, the update scheme starts from the device with the highest multiplicative factor. If $|\chi| \geq \alpha_N*\varepsilon$, a pulse is applied to the corresponding device. Then, $\chi$ is decreased according to in $\chi_{new} = \chi_{current} - \text{sign}(\chi_{current})*\alpha_N*\varepsilon$. The synaptic weight update is complete. If the condition $|\chi| \geq \alpha*\varepsilon$ is not satisfied, a move to the next device with the second highest multiplicative factor is performed, and so on (compare 904).

FIG. 10 shows a second embodiment 1000 of a matrix 1002 of memristive devices with unequal significance values, i.e., $\alpha_n \neq \alpha_n \neq 1$. Hence, the total weight $W_i$ is also here determined according to $W_i = \alpha_N W_{i,N} + \alpha_{N-1} W_{i,N-1} + \ldots + \alpha_1 W_{i,1}$. During each synaptic update only one device is updated out of N devices. A device N is selected for $x_N$ training examples for all the synapses of the network. If $|\chi| \geq \alpha_N*\varepsilon$, a pulse is applied to the corresponding device. After that, $\chi$ is decreased as in $\chi_{new} = \chi_{current} - \text{sign}(\chi_{current})*\alpha_N*\varepsilon$. Consequently, the synaptic weight update is complete. For the next $x_{N-1}$ training examples, device N−1 is selected for all the synapses of the network. The weight update procedure is the same as above for the device N−1. Then, the procedure is repeated down to device 1 and started again from device N (compare 1004).

FIG. 11 shows a third embodiment 1100 of a matrix 1102 of memristive devices with unequal significance values, i.e., $\alpha_n \neq \alpha_n \neq 1$. Hence, the total weight $W_i$ is also here determined according to $W_i = \alpha_N W_{i,N} + \alpha_{N-1} W_{i,N-1} + \ldots + \alpha_1 W_{i,1}$ and decreasing values of $\alpha_n$: $\alpha_N > \alpha_{N-1} > \ldots > \alpha_1$ (which also applies to the embodiment of FIG. 10).

During a weight update, the update scheme starts from the device with the highest multiplicative factor. If $|x| \geq \alpha_N*\varepsilon$, a pulse is applied to the corresponding memristive device. Then—also here $\chi$ is decreased as in $\chi_{new} = \chi_{current} - \text{sign}(\chi_{current})*\alpha_N*\varepsilon$. Next, it is determined if more pulses should be applied to the same device $|\chi| \geq \alpha_N*\varepsilon$. If not, one moves forward to the next device with the second highest multiplicative factor. Weight updates to all devices are performed in the same manner (compare 1104).

FIG. 12 shows a fourth embodiment 1200 of a matrix 1202 of memristive devices with unequal significance values, i.e., $\alpha_n \neq \alpha_n \neq 1$. Hence, the total weight $W_i$ is also here determined according to $W_i = \alpha_N W_{i,N} + \alpha_{N-1} W_{i,N-1} + \ldots + \alpha_1 W_{i,1}$ and decreasing values of $\alpha_n$: $\alpha_N > \alpha_{N-1} > \ldots > \alpha_1$.

Here, during each synaptic weight update only one device is updated out of N. Device N is selected for $x_N$ training examples for all the synapses of the network. If $|\chi| \geq \alpha_N*\varepsilon$, a pulse is applied to the corresponding device; then—also here—$\chi$ is decreased as in $\chi_{new} = \chi_{current} - \text{sign}$ ($\chi_{current}$)*$\alpha_N*\varepsilon$. Next, it is determined if more pulses should be applied to the same device $|\chi| \geq \alpha_N*\varepsilon$. If not, the synaptic weight update is complete.

For the next $x_{N-1}$ training examples, device N−1 is selected for all the synapses of the network. The weight update procedure is the same as above for device N−1. The procedure is repeated down to device 1 and then starts back from device N (compare 1204).

FIG. 13 shows a fifth embodiment 1300 of a matrix 1302 of memristive devices with unequal significance values, i.e., $\alpha_n \neq \alpha_n \neq 1$. However, in this case, the total weight $W_i$ is determined according to $W_i = k^{(N-1)} W_{i,N} + k^{(n-2)} W_{i,N-1} + \ldots + k^0 W_{i,1}$.

During a weight update the number of pulses to be applied, p, is determined as p=floor ($|\chi|/\varepsilon$). p is converted to a number in base k. The pulses are applied to the corresponding devices in parallel according to the value of $p_{base(k)}$. Each bit from $p_{base(k)}$ represents the number of pulses to be applied to the corresponding device. Then, $\chi$ is decreased as in $\chi_{new} = \chi_{current} - \text{sign}(\chi_{current})*p*\varepsilon$ (compare 1304).

FIG. 14 shows a similar figure as in the beginning of the sequence of algorithms proposed. However, here the probabilistic switching is addressed. The matrix 1402 of memristive devices is architected as in FIGS. 5, 6, 7. The same applies to the selection clock 1404. The graphic 1406 shows a typical probabilistic behavior of binary memristive devices depending on the number of pulse applied (e.g., number of pulses vs. conductivity G in μS). The x-y-plot 1406 should be understood as example only. The shown selection clock 1404 can exemplarily address four memristive devices. However, any other of pointer statuses of the selection clock 1404 can be implemented.

The overall synaptic weight $W_i$ is calculated as with equal significance values equal 1: $\alpha_N = \alpha_{N-1} = \ldots = \alpha_1 = 1$ (equal significance). Thus, the overall synaptic weight $W_i$ is determined as $W_i = W_{i,N} + W_{i,N-1} + \ldots + W_{i,1}$, thus $\alpha_N = \alpha_{N-1} = \alpha_1 = 1$.

The probabilistic switching can be implemented through crystallization as shown in the flowchart 1408 in FIG. 14a. During a weight update, if $|\chi| \geq \varepsilon$ (compare 1410), a pulse is applied to the address binary memristive device (compare 1412). Then, if $|\chi| < \varepsilon$, a number of pulses converted from $\chi$ are applied (compare 1414) to the same device pointed by the selection clock 1404 (FIG. 14). The selection clock is incremented and the value of $\chi$ is set to zero.

FIG. 15 shows another similar figure as earlier in the sequence of algorithms proposed. However, also here the probabilistic switching is addressed. The matrix 1502 of memristive devices is architected as in FIG. 9ff (unequal significance values). The overall synaptic weight $W_i$ is determined as according to $W_i = \alpha_N W_{i,N} + \alpha_{N-1} W_{i,N-1} + \ldots + \alpha_1 W_{i,1}$ with $\alpha_N > \alpha_{N-1} > \ldots > \alpha_1$. The probabilistic switching for the binary storage memristive devices can now be implemented through crystallization. The threshold $\varepsilon$ is now defined as the binary device granularity. Graphic 1504 shows a typical behavior of a binary storage memristive device, for which the switching probability is plotted against the number of pulses applied to the binary storage memristive device.

FIG. 15a shows an algorithm 1506 to be implemented during the weight update. If $|\chi| \geq \alpha_1*\varepsilon$ (compare 1510), the update schema starts from the device with the highest multiplicative factor (N, compare 1508). If $|\chi| \geq \alpha_N*\varepsilon$, a pulse is applied to the corresponding device. Then, $\chi$ is again decreased according to $\chi - \text{sign}(\chi)*\alpha_N*\varepsilon$. This process step is repeated as long as required with a decreasing index of the significance factors $\alpha_n$.

Next, it is determined if pulses should be applied to device 2. Thus, if $|\chi|\geq\alpha_2*\varepsilon$, a pulse is applied to device 2; this step is repeated as long as if $|\chi|\geq\alpha_2*\varepsilon$ (compare 1512).

If that is not the case, i.e., if $|\chi|<\alpha_2*\varepsilon$, $\chi$ is converted to a number of pulses p and applied to the device with the significance factor $\alpha_1$. Then, $\chi$ is set to zero (compare 1514).

FIG. 16 shows a block diagram of an embodiment of a system 1600 for mixed-precision deep learning with multi-memristive synapses. The system 1600 comprises a plurality of synapses 1602, wherein each of the plurality of synapses 1602 is a portion of an artificial neural network 1604, wherein each of the plurality of synapses 1602 is represented by a combination of a plurality of memristive devices in a crossbar 1606, wherein each of the plurality of memristive devices of each of the synapses 1602 contributes to an overall synaptic weight with a related device significance.

The system 1600 comprises also an accumulation unit 1608 adapted for accumulating a weight gradient $\Delta W$ for each synapse 1602 in a high-precision variable $\chi$, and a programming circuit 1610 adapted for performing a weight update to one of the synapses 1602 using an arbitration scheme for selecting a respective memristive device, according to which a threshold value related to the high-precision variable $\chi$ for performing the weight update is set according to the device significance of the respective memristive (in the crossbar 1606) selected by the arbitration.

Embodiments of the invention may be implemented together with virtually any type of computer, regardless of the platform being suitable for storing and/or executing program code. FIG. 17 shows, as an example, a computing system 1700 suitable for executing program code related to the proposed method.

The computing system 1700 is only one example of a suitable computer system, and is not intended to suggest any limitation as to the scope of use or functionality of embodiments of the invention described herein, regardless, whether the computer system 1700 is capable of being implemented and/or performing any of the functionality set forth hereinabove. In the computer system 1700, there are components, which are operational with numerous other general purpose or special purpose computing system environments or configurations. Examples of well-known computing systems, environments, and/or configurations that may be suitable for use with computer system/server 1700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1700 may be described in the general context of computer system-executable instructions, such as program modules, being executed by a computer system 1700. Generally, program modules may include routines, programs, objects, components, logic, data structures, and so on that perform particular tasks or implement particular abstract data types. Computer system/server 1700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1700 is shown in the form of a general-purpose computing device. The components of computer system/server 1700 may include, but are not limited to, one or more processors or processing units 1702, a system memory 1704, and a bus 1706 that couple various system components including system memory 1704 to the processor 1702. Bus 1706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1700 typically includes a variety of computer system readable media. Such media may be any available media that is accessible by computer system/server 1700, and it includes both, volatile and non-volatile media, removable and non-removable media.

The system memory 1704 may include computer system readable media in the form of volatile memory, such as random access memory (RAM) 1708 and/or cache memory 1710. Computer system/server 1700 may further include other removable/non-removable, volatile/non-volatile computer system storage media. By way of example only, a storage system 1712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1706 by one or more data media interfaces. As will be further depicted and described below, memory 1704 may include at least one program product having a set (e.g., at least one) of program modules that are configured to carry out the functions of embodiments of the invention.

The program/utility, having a set (at least one) of program modules 1716, may be stored in memory 1704 by way of example, and not limiting, as well as an operating system, one or more application programs, other program modules, and program data. Each of the operating systems, one or more application programs, other program modules, and program data or some combination thereof, may include an implementation of a networking environment. Program modules 1716 generally carry out the functions and/or methodologies of embodiments of the invention, as described herein.

The computer system/server 1700 may also communicate with one or more external devices 1718 such as a keyboard, a pointing device, a display 1720, etc.; one or more devices that enable a user to interact with computer system/server 1700; and/or any devices (e.g., network card, modem, etc.) that enable computer system/server 1700 to communicate with one or more other computing devices. Such communication can occur via Input/Output (I/O) interfaces 1714. Still yet, computer system/server 1700 may communicate with one or more networks such as a local area network (LAN), a general wide area network (WAN), and/or a public network (e.g., the Internet) via network adapter 1722. As depicted, network adapter 1722 may communicate with the other components of computer system/server 1700 via bus 1706. It should be understood that, although not shown, other hardware and/or software components could be used in conjunction with computer system/server 1700. Examples, include, but are not limited to: microcode, device drivers, redundant processing units, external disk drive arrays, RAID systems, tape drives, and data archival storage systems, etc.

Additionally, the system 1600 for mixed-precision deep learning with multi-memristive synapses may be attached to the bus system 1706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for mixed-precision deep learning with multi-memristive synapses, said method comprising
representing each synapse of an artificial neural network by a combination of a plurality of memristive devices, wherein each of said plurality of memristive devices of each of said synapses contributes to an overall synaptic weight with a related device significance, and
accumulating a weight gradient $\Delta W$ for each synapse in a high-precision variable $\chi$, and
performing a weight update to one of said synapses using an arbitration scheme for selecting a respective memristive device, wherein a threshold value related to said high-precision variable $\chi$ for performing said weight update is set according to said device significance of said respective memristive device selected by said arbitration scheme.

2. The method according to claim 1, wherein said threshold value for performing said weight update is set to a minimum device granularity of said memristive devices.

3. The method according to claim 1, wherein said memristive devices are either binary memristive devices or analog resistive devices.

4. The method according to claim 1, wherein said device significance of all memristive devices of one synapse is equal and wherein said weight update is performed according to:
as long as $|\chi_i| \leq \varepsilon$, repeat said following steps:
applying a pulse to a selected memristive device,
decreasing $\chi_i$ by $\text{sign}(\chi_i)^*\varepsilon$, and
selecting a next memristive device,
wherein $\chi_i$ represents the high-precision variable $\chi$ associated with i-th synapse of the multi-memristive synapses, and c represents memristive device granularity.

5. The method according to claim 1, wherein said device significance of all memristive devices of one synapse is equal and wherein said weight update is performed according to:
set $\chi_i = \chi_0$,
as long as $|\chi_i| \geq N^*\varepsilon$, repeat: applying a pulse to all memristive devices and decrease $\chi_i$ by $\text{sign}(\chi_i)^*N^*\varepsilon$, wherein N=number of devices and $\varepsilon$=device granularity,
as long as $|\chi_i| \geq (N-r)^*\varepsilon$, repeat: applying a pulse to all memristive devices and decrease $\chi_i$ by $\text{sign}(\chi_i)^*(N-r)^*\varepsilon$, wherein r=1,
repeat said previous step until $|\chi_i| < \varepsilon$, wherein in each iteration r is increased by 1,
wherein $\chi_i$ represents the high-precision variable $\chi$ associated with i-th synapse, $\chi_0$ represents the high-precision variable $\chi$ associated with 0-th synapse, and c represents memristive device granularity.

6. The method according to claim 1, wherein a selection clock is used for addressing a memristive device of a synapse and wherein said selection clock address is incremented by a predefined increment rate after a pulse to said selected memristive device is applied.

7. The method according to claim 1,
wherein each of N memristive devices of a synapse represents each a weight factor $W_n$, $n \in 1, 2, \ldots, N$, wherein said overall synaptic weight W is determined by
$W = \alpha_N^* W_N + \alpha_{N-1}^* W_{N-1} + \ldots + \alpha_1^* W_1$ and wherein $\alpha_N > \alpha_{N-1} > \ldots > \alpha_1$ are said device significances of said respective memristive devices.

8. The method according to claim 7,
wherein during each synaptic weight update only one memristive device n is updated by a pulse, wherein said memristive device n is determined by starting with the memristive device N having the highest significance $\alpha_N$ and continuing with memristive devices having decreasing significance values until the memristive device 1 with the significance $\alpha_1$ according to said value of $\chi$.

9. The method according to claim 8,
wherein during each synaptic weight update only one memristive device is updated, wherein respective memristive devices n of all synapses having same significance are selected for update for a predefined number of training examples of said artificial neural network.

10. The method according to claim 7, wherein during each synaptic weight update multiple memristive devices are updated by multiple pulses as long as $|\chi_i| \geq \alpha_n^*\varepsilon$, wherein $\chi_i$ is decreased according to $\chi_i - \text{sign}(\chi_i)^* \alpha_n^* \varepsilon$ after an application of every pulse to said respective memristive device n, thereby starting with said memristive device N having said highest significance $\alpha_N$ and continuing with memristive devices having sequentially decreasing significance values until said memristive device 1 with said significance $\alpha_1$, wherein $\chi_i$ represents the high-precision variable $\chi$ associated with i-th synapse, $\varepsilon$ represents memristive device granularity, and $\alpha_n$ represents significance associated with said respective memristive device n.

11. The method according to claim 7, wherein during each synaptic weight update only one memristive device n is updated by multiple pulses as long as $|\chi_i| \geq \alpha_n^* \varepsilon$, wherein $\chi_i$ is decreased according to $\chi_i - \text{sign}(\chi_i)^* \alpha_n^* \varepsilon$ after said application of every pulse, wherein respective memristive devices n of all synapses starting with said devices having said significance value $\alpha_n$ are selected for update for a predefined number of training examples of said artificial neural network, wherein $\chi_i$ represents the high-precision variable x associated with i-th synapse, $\varepsilon$ represents memristive device granularity, and $\alpha_n$ represents significance associated with said respective memristive device.

12. The method according to claim 7, wherein $\alpha_N = k^{(N-1)}$, $\alpha_{N-1} = k^{(N-2)}$, ..., $\alpha_1 = k^0$, wherein during a weight update a number of pulses p for updating a memristive device is determined by p=floor $(|\chi|/\varepsilon)$, wherein $\varepsilon$ represents memristive device granularity, wherein said number of pulses are converted to a number base k, and wherein pulses are applied to corresponding memristive devices in parallel according to a value $p_{base(k)}$.

13. The method according to claim 1, wherein said device significance of all memristive devices of one synapse is equal and wherein said memristive devices have only a binary storage capability and wherein said weight update is performed according to:

as long as $|\chi_i| \geq \varepsilon_b$, wherein $\varepsilon_b$ is said binary device granularity, $\chi_i$ represents the high-precision variable $\chi$ associated with i-th synapse, repeat said following steps:

applying a pulse to a selected memristive device, decrease $\chi_i$ by $\text{sign}(\chi_i)^* \varepsilon_b$, and selecting a next memristive device;

if said condition $(|\chi_i| < \varepsilon_b)$ is fulfilled perform said following steps converting $\chi_i$ into number of pulses p, applying p pulses to device, setting $\chi_i = 0$, and selecting a next memristive device.

14. The method according to claim 7, wherein said memristive devices have only binary storage capability, wherein during each synaptic weight update multiple memristive devices are updated by multiple pulses as long as $|\chi_i| \geq \alpha_n^* \varepsilon_b$, wherein $\chi_i$ is decreased according to $\chi_i - \text{sign}(\chi_i)^* \alpha_n^* \varepsilon_b$ after an application of every pulse to a respective memristive device n, thereby starting with said memristive device N having said highest significance $\alpha_N$ and continuing with memristive devices having sequentially decreasing significance values until $\alpha_2$ and using said following procedure with said memristive device with said significance $\alpha_1$:

converting $\chi_i$ into number of pulses p, applying p pulses to memristive device 1 with said significant factor $\alpha_1$, and setting $\chi_i = 0$, wherein $\chi_i$ represents the high-precision variable $\chi$ associated with i-th synapse, $\varepsilon_b$ represents binary device granularity, and $\alpha_n$ represents significance associated with said respective memristive device.

15. A system for mixed-precision deep learning with multi-memristive synapses, said system comprising a plurality of synapses, wherein each of said plurality of synapses is a portion of an artificial neural network, wherein each of said plurality of synapses is represented by a combination of a plurality of memristive devices, wherein each of said plurality of memristive devices of each of said synapses contributes to an overall synaptic weight with a related device significance, an accumulation unit adapted for accumulating a weight gradient $\Delta W$ for each synapse in a high-precision variable $\chi$, and a programming circuit adapted for performing a weight update to one of said synapses using an arbitration scheme for selecting a respective memristive device, wherein a threshold value related to said high-precision variable $\chi$ for performing the weight update is set according to the device significance of the respective memristive device selected by the arbitration scheme.

16. The system according to claim 15, wherein said threshold value for performing said weight update is set to a minimum device granularity of said memristive devices.

17. The system according to claim 15, wherein said memristive devices are either binary memristive devices or analog resistive devices.

18. The system according to claim 15, wherein said device significance of all memristive devices of one synapse is equal and wherein said accumulation unit and said programming circuit are adapted to interact to perform a weight update according to:

as long as $|\chi_i| \geq \varepsilon$, repeat said following steps:

applying a pulse to a selected memristive device, decreasing $\chi_i$ by $\text{sign}(\chi_i)^* \varepsilon$, and selecting a next memristive device, wherein $\chi_i$ represents the high-precision variable x associated with i-th synapse of the multi-memristive synapses, and c represents memristive device granularity.

19. The system according to claim 15, wherein said device significance of all memristive devices of one synapse is equal and said accumulation unit and said programming circuit are adapted to interact to perform a weight update according to:

set $\chi_i = \chi_0$, as long as $|\chi_i| \geq N^* \varepsilon$, repeating: applying a pulse to all memristive devices and decreasing $\chi_i$ by $\text{sign}(\chi_i)^* N^* \varepsilon$, wherein N=number of devices and $\varepsilon$=device granularity, as long as $|\chi_i| \geq (N-r)^* \varepsilon$, repeating: applying a pulse to all memristive devices and decreasing $\chi_i$ by $\text{sign}(\chi_i)^* (N-r)^* \varepsilon$, wherein r=1, repeating said previous step until $|\chi_i| > \varepsilon$, wherein in each iteration r is increased by 1, wherein $\chi_i$ represents the high-precision variable $\chi$ associated with i-th synapse, $\chi_0$ represents the high-precision variable $\chi$ associated with 0-th synapse, and c represents memristive device granularity.

20. The system according to claim 15, also comprising a selection clock adapted to be used for addressing a memristive device of a synapse and wherein said selection clock is also adapted for incrementing said selection clock address by a predefined increment rate after a pulse to said selected memristive device is applied.

21. The system according to claim 15, wherein each of N memristive devices of a synapse represents each a weight factor $W_n$, $n \in 1, 2, \ldots, N$, wherein said overall synaptic weight W is determined by
$W=\alpha_N*W_N+\alpha_{N-1}*W_{N-1}+ \ldots +\alpha_1*W_1$ and wherein $\alpha_N>\alpha_{N-1}> \ldots >\alpha_1$ are said device significances of said respective memristive devices.

22. The system according to claim 21, wherein during each synaptic weight update multiple memristive devices are updated by multiple pulses as long as $|\chi_i| \geq \alpha_n*\varepsilon$, wherein $\chi_i$ is decreased according to $\chi_i - \text{sign}(\chi_i)*\alpha_n*\varepsilon$ after an application of every pulse to said respective memristive device n,
thereby starting with said memristive device N having said highest significance $\alpha_N$ and continuing with memristive devices having sequentially decreasing significance values until said memristive device 1 with said significance $\alpha_1$,
wherein $\alpha_i$ represents the high-precision variable x associated with i-th synapse,
$\varepsilon$ represents memristive device granularity, and
$\alpha_n$ represents significance associated with said respective memristive device n.

23. The system according to claim 21,
wherein during each synaptic weight update only one memristive device n is updated by multiple pulses as long as $|\chi_i| \geq \alpha_n*\varepsilon$,
wherein $\chi_i$ is decreased according to $\chi_i - \text{sign}(\chi_i)*\alpha_n*\varepsilon$ after said application of every pulse, wherein respective memristive devices n of all synapses starting with the devices having said significance value $\alpha_n$ are selected for update for training examples of said artificial neural network,
wherein $\chi_i$ represents the high-precision variable x associated with i-th synapse,
$\varepsilon$ represents memristive device granularity, and
$\alpha_n$ represents significance associated with said respective memristive device.

24. The system according to claim 21,
wherein $\alpha_N=k^{(N-1)}$, $\alpha_{N-1}=k^{(N-2)}$, \ldots, $\alpha_1=k^0$, wherein during a weight update a number of pulses p for updating a memristive device is determined by p=floor($|\chi|/\varepsilon$), wherein $\varepsilon$ represents memristive device granularity,
wherein said number of pulses are converted to a number base k, and wherein pulses are applied to corresponding memristive devices in parallel according to a value $p_{base(k)}$.

25. A computer program product for mixed-precision deep learning with multi-memristive synapses, said computer program product comprising a computer readable storage medium having program instructions embodied therewith, said program instructions being executable by one or more computing systems or controllers to cause said one or more computing systems to
represent each synapse of an artificial neural network by a combination of a plurality of memristive devices, wherein each of said plurality of memristive devices of each of said synapses contributes to an overall synaptic weight with a related device significance, and
accumulate a weight gradient $\Delta W$ for each synapse in a high-precision variable $\chi$, and perform a weight update to one of said synapses using an arbitration scheme for selecting a respective memristive device, wherein a threshold value related to said high-precision variable $\chi$ for performing said weight update is set according to said device significance of said respective memristive device selected by said arbitration scheme.

\* \* \* \* \*